United States Patent
Inoue et al.

(10) Patent No.: US 6,529,290 B2
(45) Date of Patent: Mar. 4, 2003

(54) DUBBING APPARATUS

(75) Inventors: Hiraku Inoue, Kanagawa (JP); Eriko Osaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/007,365

(22) Filed: Nov. 8, 2001

(65) Prior Publication Data

US 2002/0060811 A1 May 23, 2002

Related U.S. Application Data

(62) Division of application No. 09/131,094, filed on Aug. 7, 1998, now Pat. No. 6,388,766.

(30) Foreign Application Priority Data

Aug. 8, 1997 (JP) ................................................ 9-214748

(51) Int. Cl.[7] ...................... G06K 15/02; G11B 23/40; G09F 3/00; B42D 15/00
(52) U.S. Cl. ...................... 358/1.18; 369/273; 369/289; 360/131; 283/81; 40/638
(58) Field of Search .................... 358/1.18, 1.6; 493/961; 283/81; 369/273, 289–291; 360/131, 132, 133, 135; 707/507, 520; 709/231; 400/76; 40/340, 638, 299.01

(56) References Cited

U.S. PATENT DOCUMENTS

| | | | | |
|---|---|---|---|---|
| 4,903,255 A | * | 2/1990 | Sugaya et al. | 283/81 |
| 4,939,674 A | * | 7/1990 | Price et al. | 358/1.18 |
| 5,216,552 A | | 6/1993 | Dunlap et al. | 360/33.1 |
| 5,559,934 A | * | 9/1996 | Ogura et al. | 358/1.18 |
| 5,592,596 A | * | 1/1997 | Balsom | 358/1.18 |
| 5,621,864 A | * | 4/1997 | Benade et al. | 358/1.18 |
| 5,677,999 A | * | 10/1997 | Hidaka et al. | 358/1.18 |
| 5,793,980 A | * | 8/1998 | Glaser et al. | 709/231 |
| 6,182,565 B1 | * | 2/2001 | Takayama et al. | 400/76 |

FOREIGN PATENT DOCUMENTS

| | | | |
|---|---|---|---|
| EP | 0361315 | 4/1990 | G11B/27/036 |
| JP | 8051588 | 2/1996 | H04N/5/7826 |

* cited by examiner

*Primary Examiner*—Scott Rogers
(74) *Attorney, Agent, or Firm*—Jay H. Maioli

(57) ABSTRACT

A dubbing system is provided in which information including lyrics, title, image of a piece of music is printed while audio data representing the piece of music distributed from an information center or supplied from a mass storage device installed in the dubbing system is being recorded onto a recording medium.

8 Claims, 30 Drawing Sheets

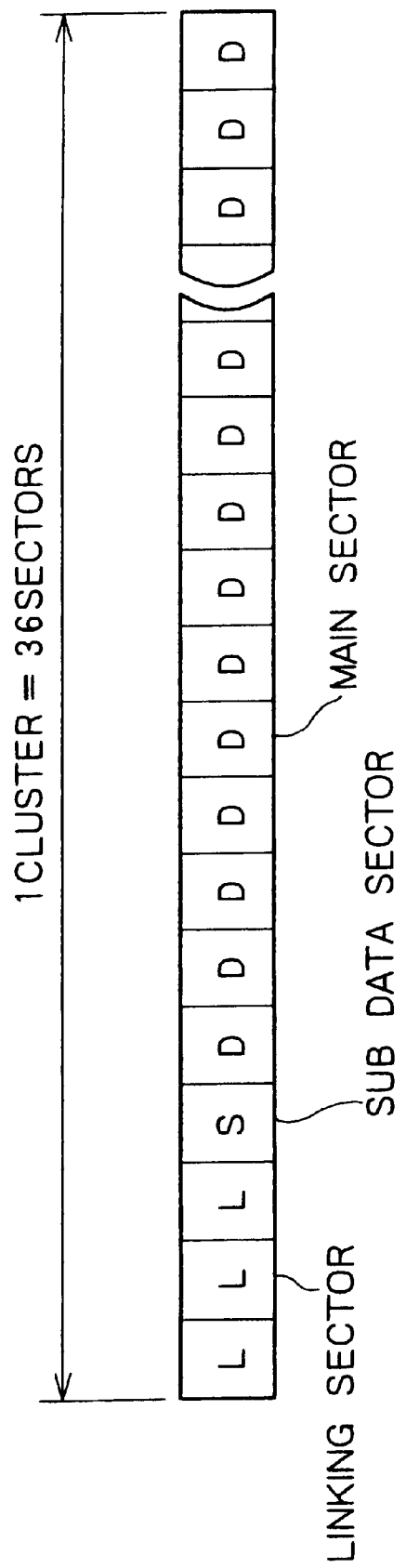

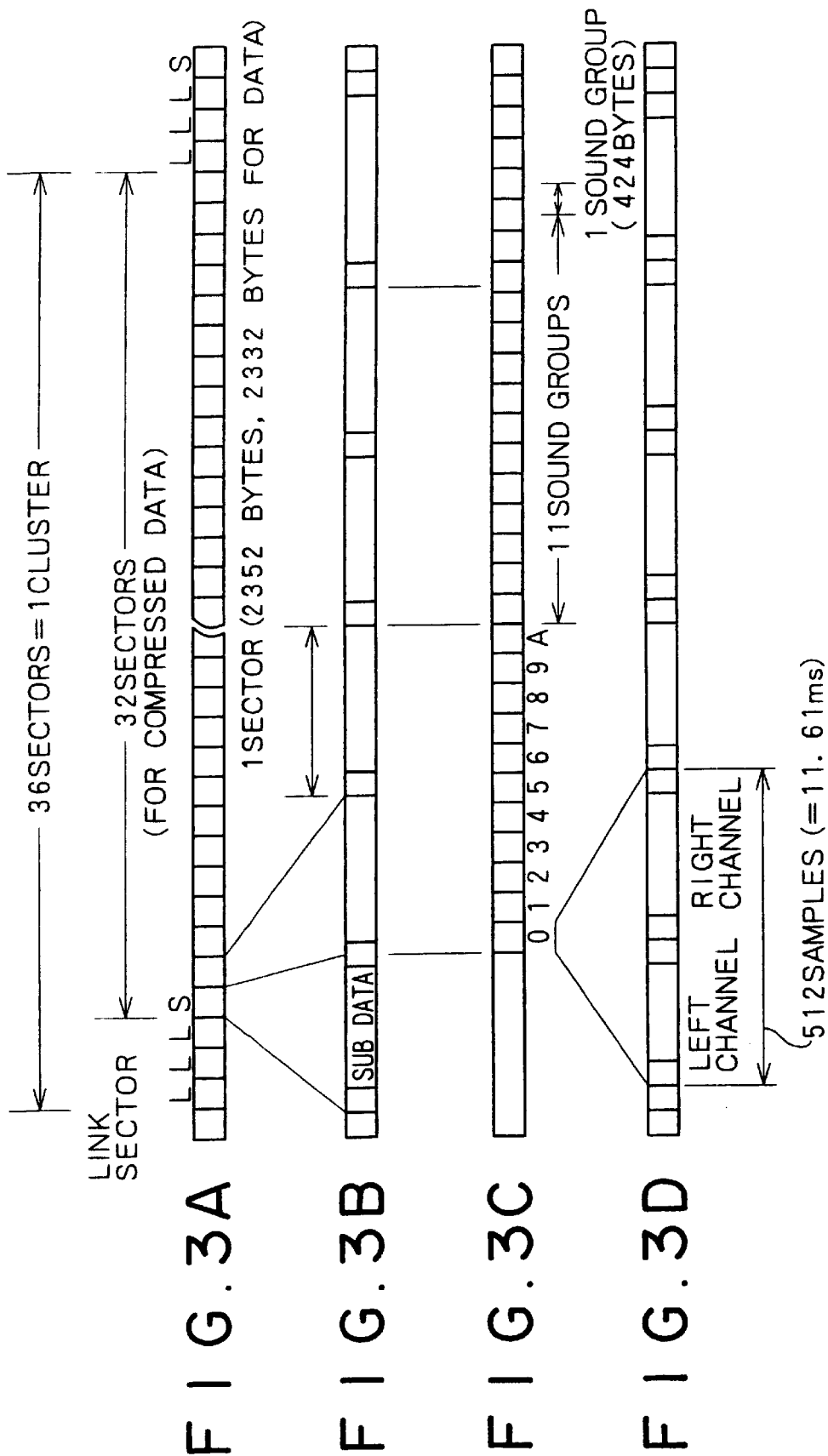

FIG. 4

| 1 | 2 | 3 | 4 | |
|---|---|---|---|---|
| ←―― 16bits ――→ | | ←―― 16bits ――→ | | |
| MSB       LSB | MSB       LSB | MSB       LSB | MSB       LSB | |
| 00000000 | 11111111 | 11111111 | 11111111 | 0 |
| 11111111 | 11111111 | 11111111 | 11111111 | 1 |
| 11111111 | 11111111 | 11111111 | 00000000 | 2 |
| Cluster H | Cluster L | Sector (00h) | MODE (02h) | 3 |
| 00000000 | 00000000 | 00000000 | 00000000 | 4 |
| 00000000 | 00000000 | 00000000 | 00000000 | 5 |
| 00000000 | 00000000 | 00000000 | 00000000 | 6 |
| Maker code | Model code | First TNO | Last TNO | 7 |
| 00000000 | 00000000 | 00000000 | Used Sectors | 8 |
| 00000000 | 00000000 | 00000000 | 00000000 | 9 |
| 00000000 | 00000000 | 00000000 | Disc Serial No | 10 |
| Disc | ID | P-DFA | P-EMPTY | 11 |
| P-FRA | P-TN01 | P-TN02 | P-TN03 | 12 |
| P-TN04 | P-TN05 | P-TN06 | P-TN07 | 13 |

| | | | | |
|---|---|---|---|---|
| P-TN0248 | P-TN0249 | P-TN0250 | P-TN0251 | 74 |
| P-TN0252 | P-TN0253 | P-TN0254 | P-TN0255 | 75 |
| 00000000 | 00000000 | 00000000 | 00000000 | 76 |
| 00000000 | 00000000 | 00000000 | 00000000 | 77 |

| | | | |
|---|---|---|---|
| (01h) | START ADDRESS | TRACK MODE | 78 |
| | END ADDRESS | LINK INFORMATION | 79 |
| (02h) | START ADDRESS | TRACK MODE | 80 |
| | END ADDRESS | LINK INFORMATION | 81 |
| (03h) | START ADDRESS | TRACK MODE | 82 |
| | END ADDRESS | LINK INFORMATION | 83 |

| | | | |
|---|---|---|---|
| (FCh) | START ADDRESS | TRACK MODE | 580 |
| | END ADDRESS | LINK INFORMATION | 581 |
| (FDh) | START ADDRESS | TRACK MODE | 582 |
| | END ADDRESS | LINK INFORMATION | 583 |
| (FEh) | START ADDRESS | TRACK MODE | 584 |
| | END ADDRESS | LINK INFORMATION | 585 |
| (FFh) | START ADDRESS | TRACK MODE | 586 |
| | END ADDRESS | LINK INFORMATION | 587 |

U-TOC SECTOR-0

Start and End Address 24bit

CLUSTER (14 BITS)

SECTOR (6 BITS)

SOUND GROUP (4 BITS)

Track mode 8bit d1 d2 d3 d4 d5 d6 d7 d8 d1=0:write protected
 =1:write permitted
d2=0:copy right protected
 =1:not protected
d3=0:original
 =1:1st or higher generation
d4=0:audio
 =1:reserved
d5=0: ⎤ normal audio
d6=0: ⎦ else deserved
d7=0:mono
 =1:stereo
d8=0:emphasis off
 =1:emphasis 50/15μs

FIG. 8

| 1 | 2 | 3 | 4 | |
|---|---|---|---|---|
| ←—16bits—→ | | ←—16bits—→ | | |
| MSB　　　LSB | MSB　　　LSB | MSB　　　LSB | MSB　　　LSB | |
| 00000000 | 11111111 | 11111111 | 11111111 | 0 |
| 11111111 | 11111111 | 11111111 | 11111111 | 1 |
| 11111111 | 11111111 | 11111111 | 00000000 | 2 |
| Cluster H | Cluster L | Sector (01h) | MODE (02h) | 3 |
| 00000000 | 00000000 | 00000000 | 00000000 | 4 |
| 00000000 | 00000000 | 00000000 | 00000000 | 5 |
| 00000000 | 00000000 | 00000000 | 00000000 | 6 |
| 00000000 | 00000000 | 00000000 | 00000000 | 7 |
| 00000000 | 00000000 | 00000000 | 00000000 | 8 |
| 00000000 | 00000000 | 00000000 | 00000000 | 9 |
| 00000000 | 00000000 | 00000000 | 00000000 | 10 |
| 00000000 | 00000000 | 00000000 | P-EMPTY | 11 |
| 00000000 | P-TNA1 | P-TNA2 | P-TNA3 | 12 |
| P-TNA4 | P-TNA5 | P-TNA6 | P-TNA7 | 13 |

| | | | | |
|---|---|---|---|---|
| P-TNA248 | P-TNA249 | P-TNA250 | P-TNA251 | 74 |
| P-TNA252 | P-TNA253 | P-TNA254 | P-TNA255 | 75 |
| DISK NAME | | | | 76 |
| DISK NAME | | | LINK INFORMATION | 77 |
| (01h) DISC NAME / TRACK NAME | | | | 78 |
| DISC NAME / TRACK NAME | | | LINK INFORMATION | 79 |
| (02h) DISC NAME / TRACK NAME | | | | 80 |
| DISC NAME / TRACK NAME | | | LINK INFORMATION | 81 |
| (03h) DISC NAME / TRACK NAME | | | | 82 |
| DISC NAME / TRACK NAME | | | LINK INFORMATION | 83 |

| | | | | |
|---|---|---|---|---|
| (FEh) DISC NAME / TRACK NAME | | | | 584 |
| DISC NAME / TRACK NAME | | | LINK INFORMATION | 585 |
| (FFh) DISC NAME / TRACK NAME | | | | 586 |
| DISC NAME / TRACK NAME | | | LINK INFORMATION | 587 |

U-TOC SECTOR-1

FIG.9

| 1 | 2 | 3 | 4 | |
|---|---|---|---|---|
| ← 16bit → | | ← 16bit → | | |
| MSB　　　　LSB | MSB　　　　LSB | MSB　　　　LSB | MSB　　　　LSB | |
| 00000000 | 11111111 | 11111111 | 11111111 | 0 |
| 11111111 | 11111111 | 11111111 | 11111111 | 1 |
| 11111111 | 11111111 | 11111111 | 00000000 | 2 |
| Cluster H | Cluster L | Sector (02h) | MODE (02h) | 3 |
| 00000000 | 00000000 | 00000000 | 00000000 | 4 |
| 00000000 | 00000000 | 00000000 | 00000000 | 5 |
| 00000000 | 00000000 | 00000000 | 00000000 | 6 |
| 00000000 | 00000000 | 00000000 | 00000000 | 7 |
| 00000000 | 00000000 | 00000000 | 00000000 | 8 |
| 00000000 | 00000000 | 00000000 | 00000000 | 9 |
| 00000000 | 00000000 | 00000000 | 00000000 | 10 |
| 00000000 | 00000000 | 00000000 | P-EMPTY | 11 |
| 00000000 | P-TRD1 | P-TRD2 | P-TRD3 | 12 |
| P-TRD4 | P-TRD5 | P-TRD6 | P-TRD7 | 13 |

| | | | | |
|---|---|---|---|---|
| P-TRD248 | P-TRD249 | P-TRD250 | P-TRD251 | 74 |
| P-TRD252 | P-TRD253 | P-TRD254 | P-TRD255 | 75 |
| DISC RECORDING DATE | | | | 76 |
| | | MAKER CODE | MODEL CODE | 77 |
| (01h) TRACK RECORDING DATE | | | | 78 |
| | | MAKER CODE | MODEL CODE | 79 |
| (02h) TRACK RECORDING DATE | | | | 80 |
| | | MAKER CODE | MODEL CODE | 81 |
| (03h) TRACK RECORDING DATE | | | | 82 |
| | | MAKER CODE | MODEL CODE | 83 |

| | | | | |
|---|---|---|---|---|
| (FEh) TRACK RECORDING DATE | | | | 584 |
| | | MAKER CODE | (LINK INFORMATION) | 585 |
| (FFh) TRACK RECORDING DATE | | | | 586 |
| | | MAKER CODE | (LINK INFORMATION) | 587 |

U-TOC-SECTOR 2

FIG. 10

| 1 | 2 | 3 | 4 | |
|---|---|---|---|---|
| ←―16bits―→ | | ←―16bits―→ | | |
| MSB   LSB | MSB   LSB | MSB   LSB | MSB   LSB | |
| 00000000 | 11111111 | 11111111 | 11111111 | 0 |
| 11111111 | 11111111 | 11111111 | 11111111 | 1 |
| 11111111 | 11111111 | 11111111 | 00000000 | 2 |
| Cluster H | Cluster L | Sector (04h) | MODE (02h) | 3 |
| 00000000 | 00000000 | 00000000 | 00000000 | 4 |
| 00000000 | 00000000 | 00000000 | 00000000 | 5 |
| 00000000 | 00000000 | 00000000 | 00000000 | 6 |
| 00000000 | 00000000 | 00000000 | 00000000 | 7 |
| 00000000 | 00000000 | 00000000 | 00000000 | 8 |
| 00000000 | 00000000 | 00000000 | 00000000 | 9 |
| 00000000 | 00000000 | 00000000 | char·code | 10 |
| 00000000 | 00000000 | 00000000 | P-EMPTY | 11 |
| 00000000 | P-TNA1 | P-TNA2 | P-TNA3 | 12 |
| P-TNA4 | P-TNA5 | P-TNA6 | P-TNA7 | 13 |

| | 1 | 2 | 3 | 4 | |
|---|---|---|---|---|---|
| | P-TNA248 | P-TNA249 | P-TNA250 | P-TNA251 | 74 |
| | P-TNA252 | P-TNA253 | P-TNA254 | P-TNA255 | 75 |
| | DISC NAME | | | | 76 |
| | DISC NAME | | | LINK INFORMATION | 77 |
| (01h) | DISC NAME / TRACK NAME | | | | 78 |
| | DISC NAME / TRACK NAME | | | LINK INFORMATION | 79 |
| (02h) | DISC NAME / TRACK NAME | | | | 80 |
| | DISC NAME / TRACK NAME | | | LINK INFORMATION | 81 |
| (03h) | DISC NAME / TRACK NAME | | | | 82 |
| | DISC NAME / TRACK NAME | | | LINK INFORMATION | 83 |

| | | | |
|---|---|---|---|
| (FEh) | DISC NAME / TRACK NAME | | 584 |
| | DISC NAME / TRACK NAME | LINK INFORMATION | 585 |
| (FFh) | DISC NAME / TRACK NAME | | 586 |
| | DISC NAME / TRACK NAME | LINK INFORMATION | 587 |

U-TOC SECTOR-4

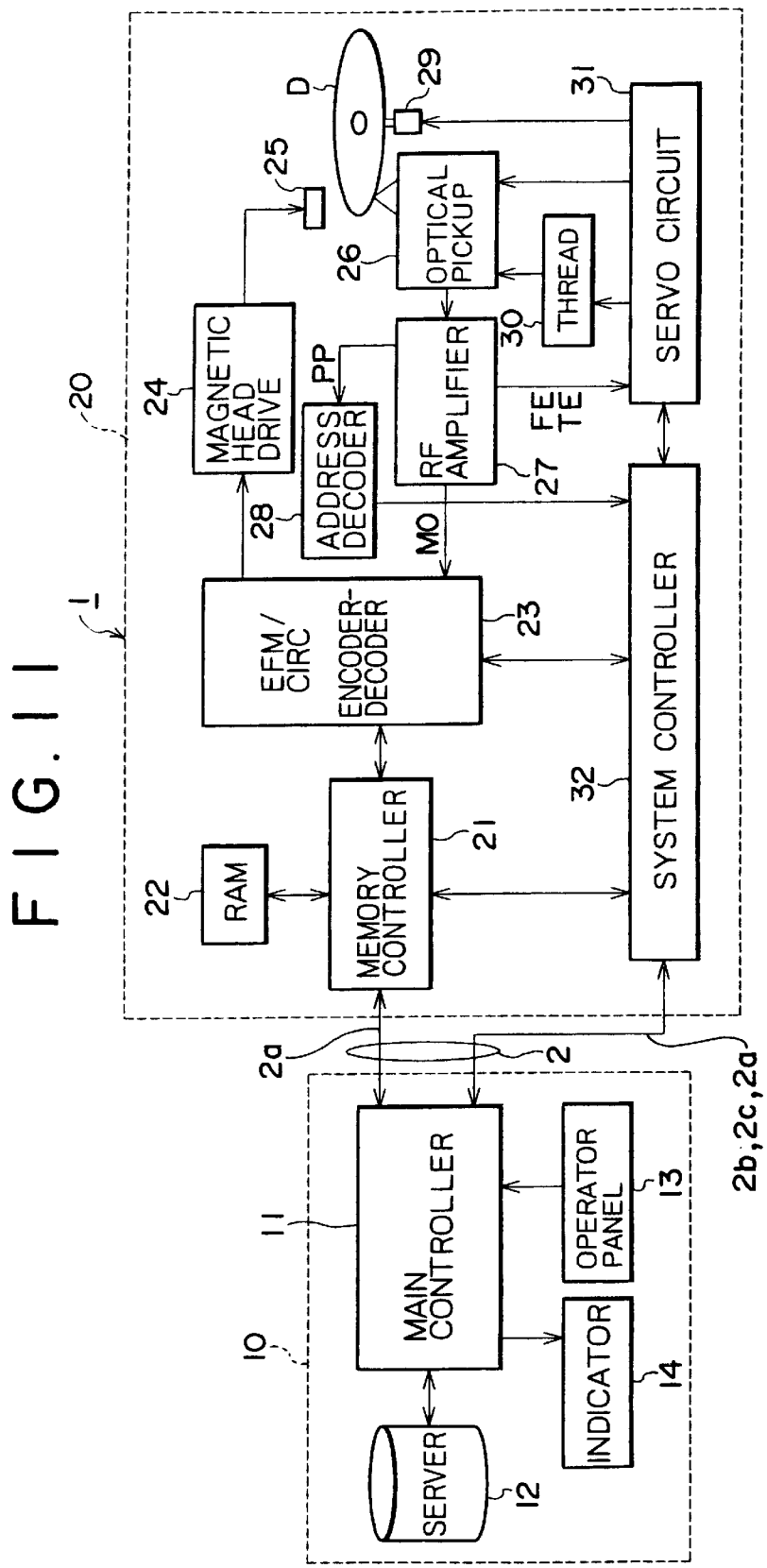

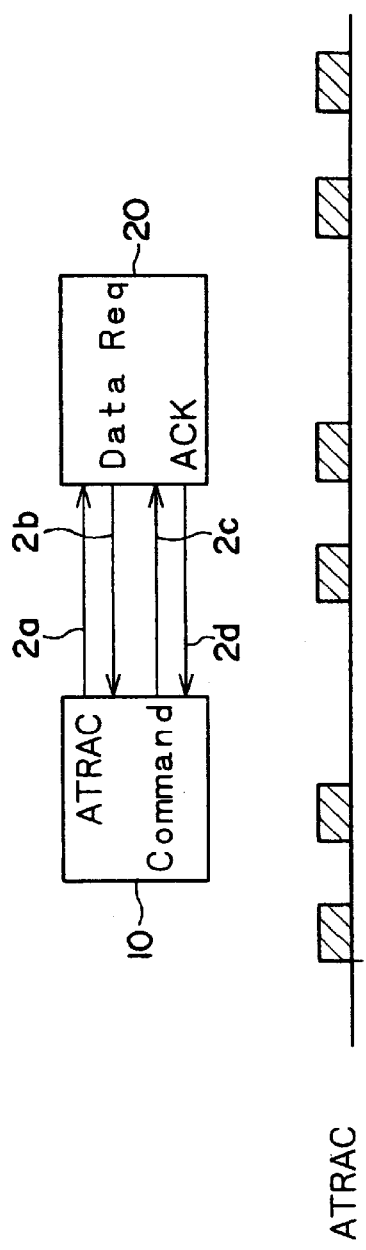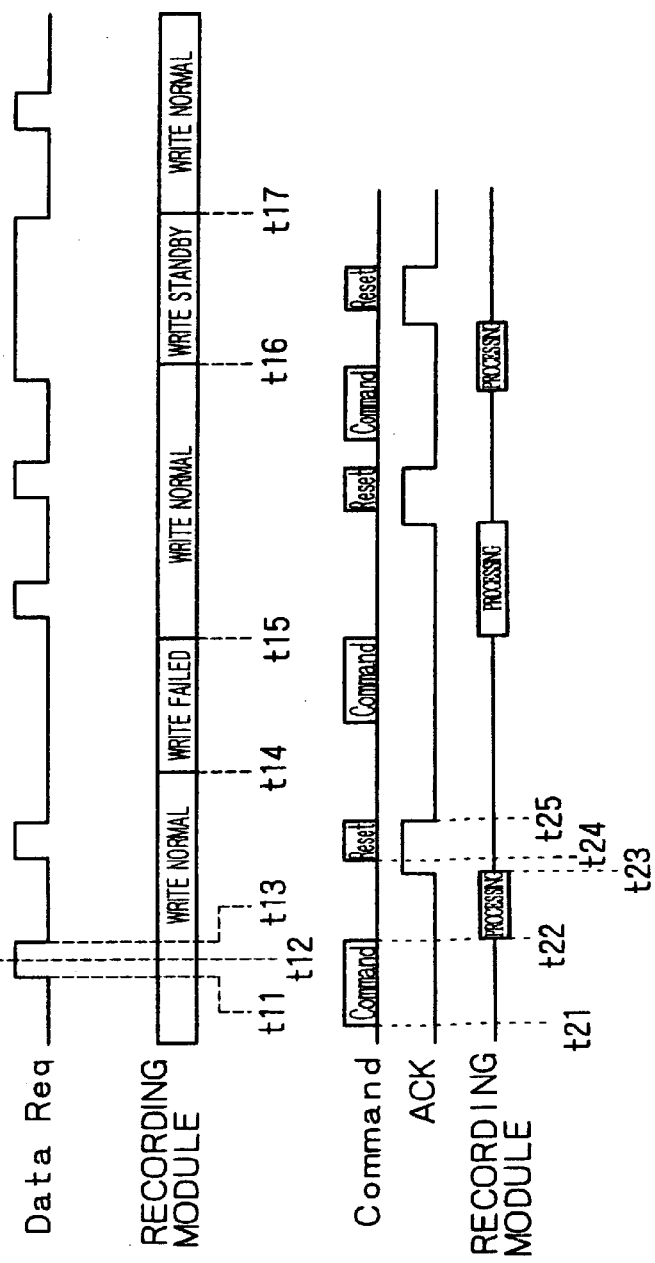
FIG. 12A
FIG. 12B
FIG. 12C

SERVER

| Title | trmd | Track Size |
|---|---|---|
| ByeBye | a6 | 0002.00.00 |
| Hello | a6 | 0010.2f.0a |
| Morning | 86 | 0020.1e.00 |
| ...... | | |

DISK D

| TNO Title | trmd | Track Size |
|---|---|---|
| Tr1 Emotion | e6 | 0011.05.02 |
| Tr2 Dream | e6 | 0022.1f.0a |

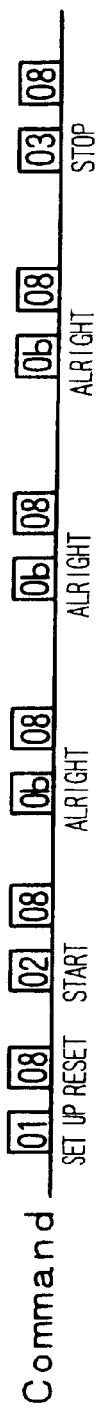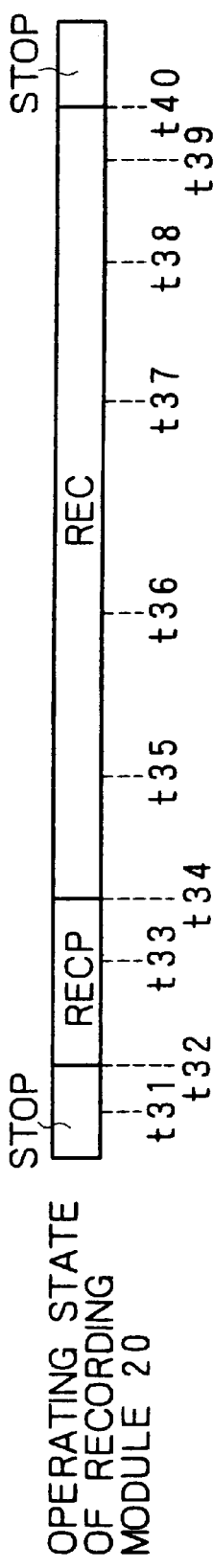

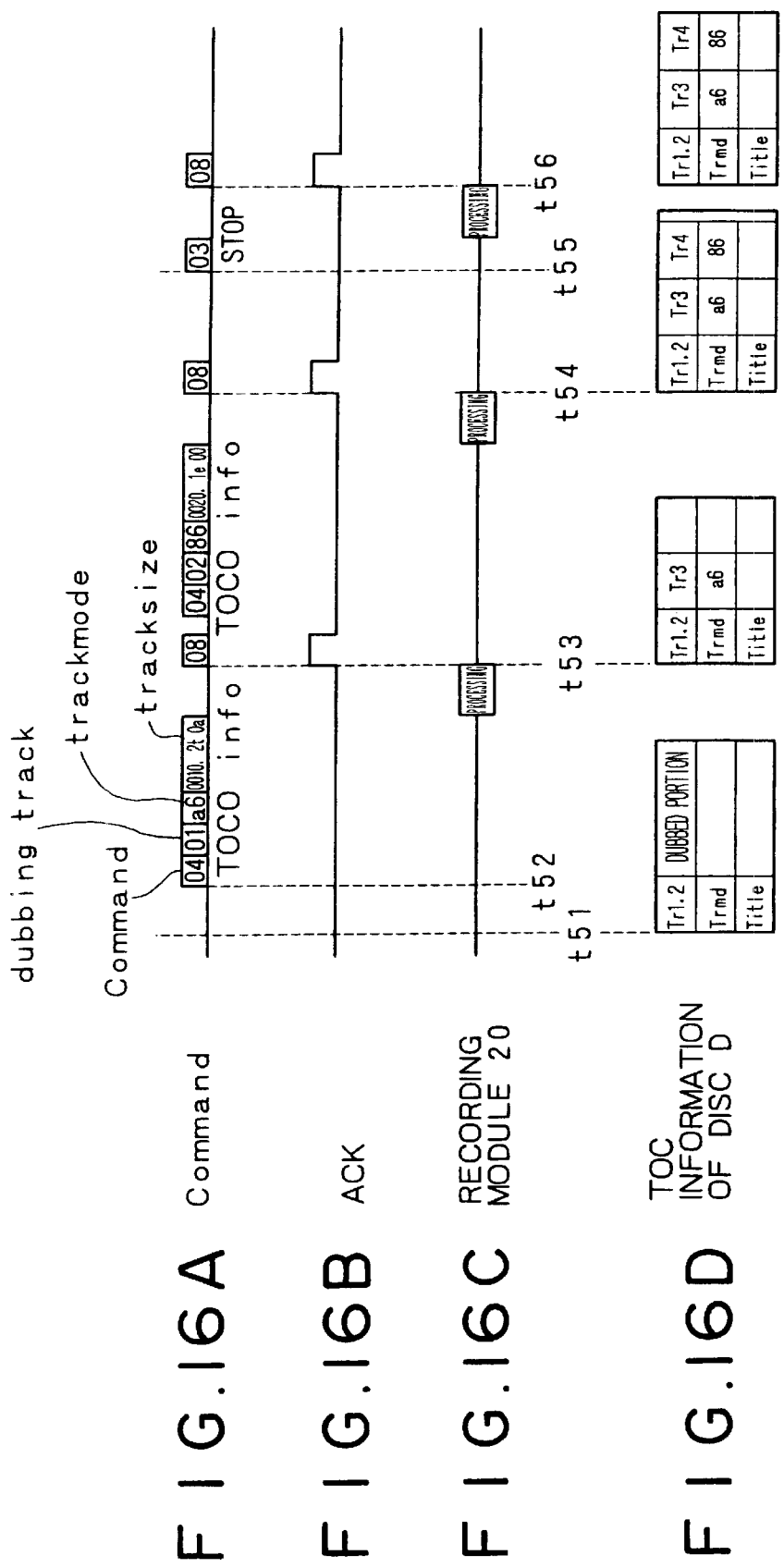

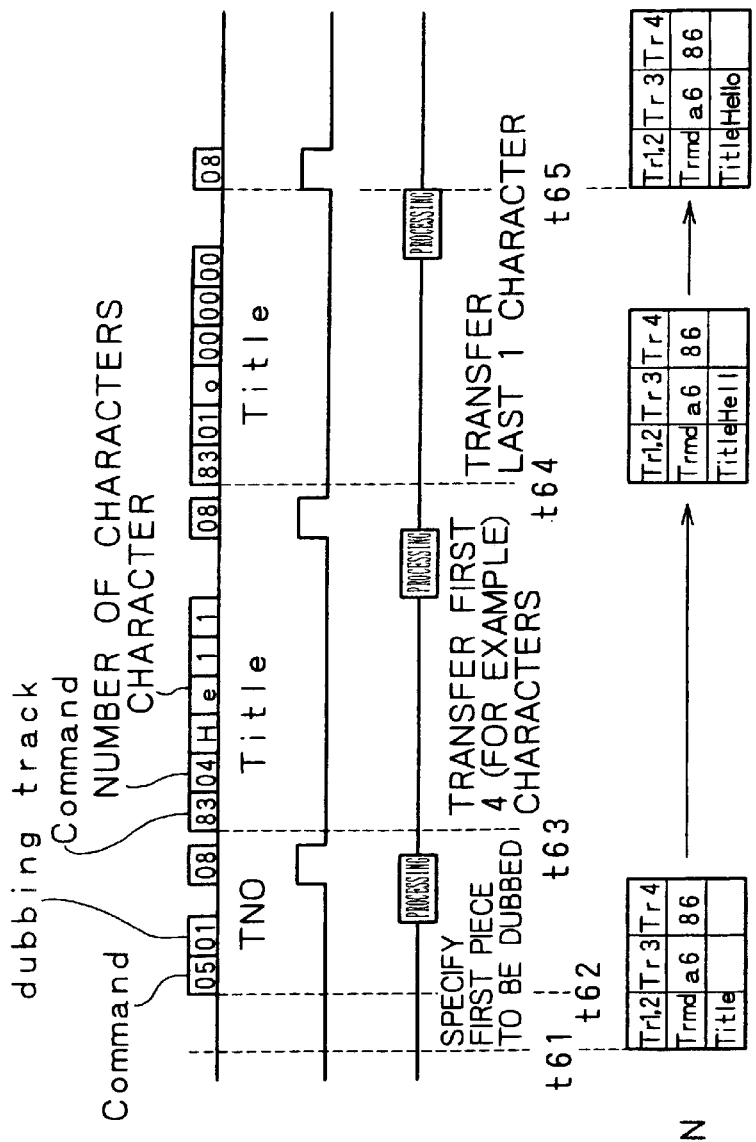

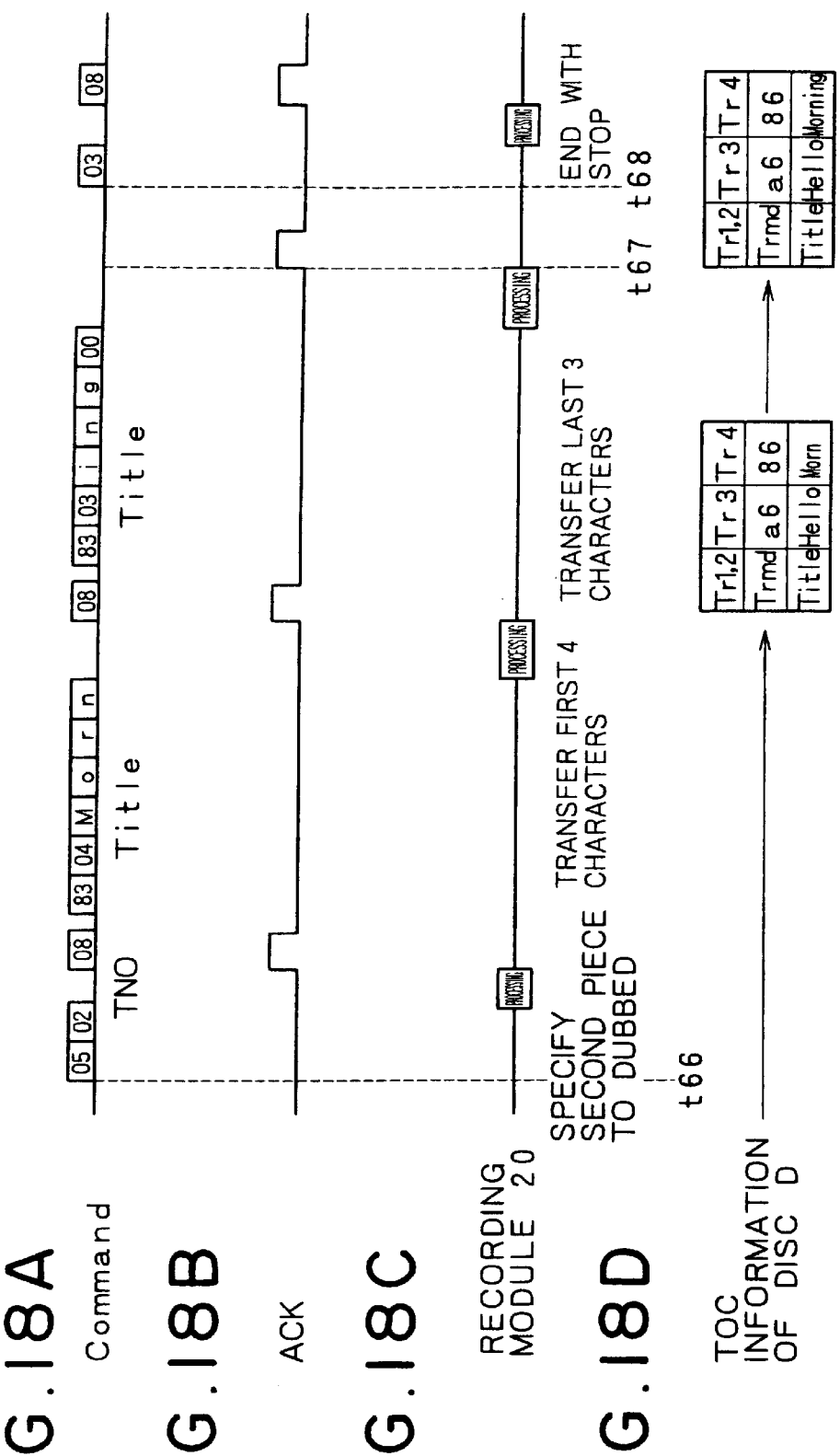
FIG.18A Command
FIG.18B ACK
FIG.18C RECORDING MODULE 20
FIG.18D TOC INFORMATION OF DISC D

FIG. 19

| TNO | Title   | trmd | Track Size    |
|-----|---------|------|---------------|
| Tr1 | Emotion | e6   | 0011. 05. 02  |
| Tr2 | Dream   | e6   | 0022. 1f. 0a  |
| Tr3 | Hello   | a6   | 0010. 2f. 0a  |
| Tr4 | Morning | 86   | 0020. 1e. 00  |

FIG. 25

| | | Moniter | UNIT COUNT=3 | M1=0000-0030<br>M2=0200-0240<br>M3=0370-0400 |
|---|---|---|---|---|
| TRACK 1 | | Photo | Track1.bmp | |
| | | Text | Track1.txt | |
| | | Video CD | Chapter1 | |
| | | URL | http://www.xxx.CD.jp.track1.htm | |
| | | Moniter | UNIT COUNT=4 | M1=0000-0040<br>M2=0210-0250<br>M3=0270-0280<br>M4=0470-0500 |
| TRACK 2 | | Photo | Track2.bmp | |
| | | Text | Track2.txt | |
| | | Video CD | Chapter2 | |
| | | URL | http://www.xxx.CD.jp.track2.htm | |
| | | Moniter | | |
| TRACK n | | Photo | Trackn.bmp | |
| | | Text | Trackn.txt | |
| | | Video CD | Chaptern | |
| | | URL | http://www.xxx.CD.jp.trackn.htm | |

F I G. 29
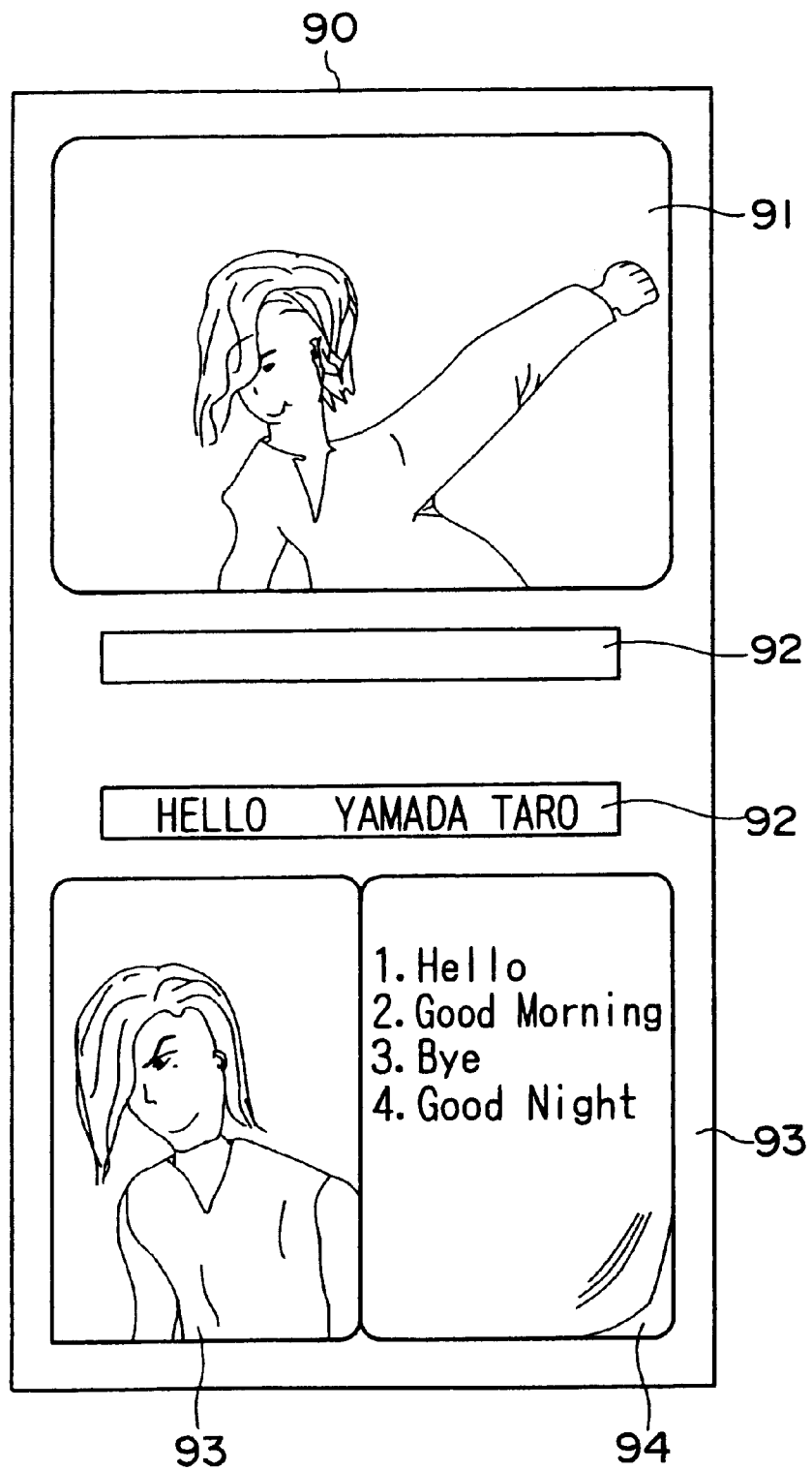

LYRICS CARD

COVER CARD

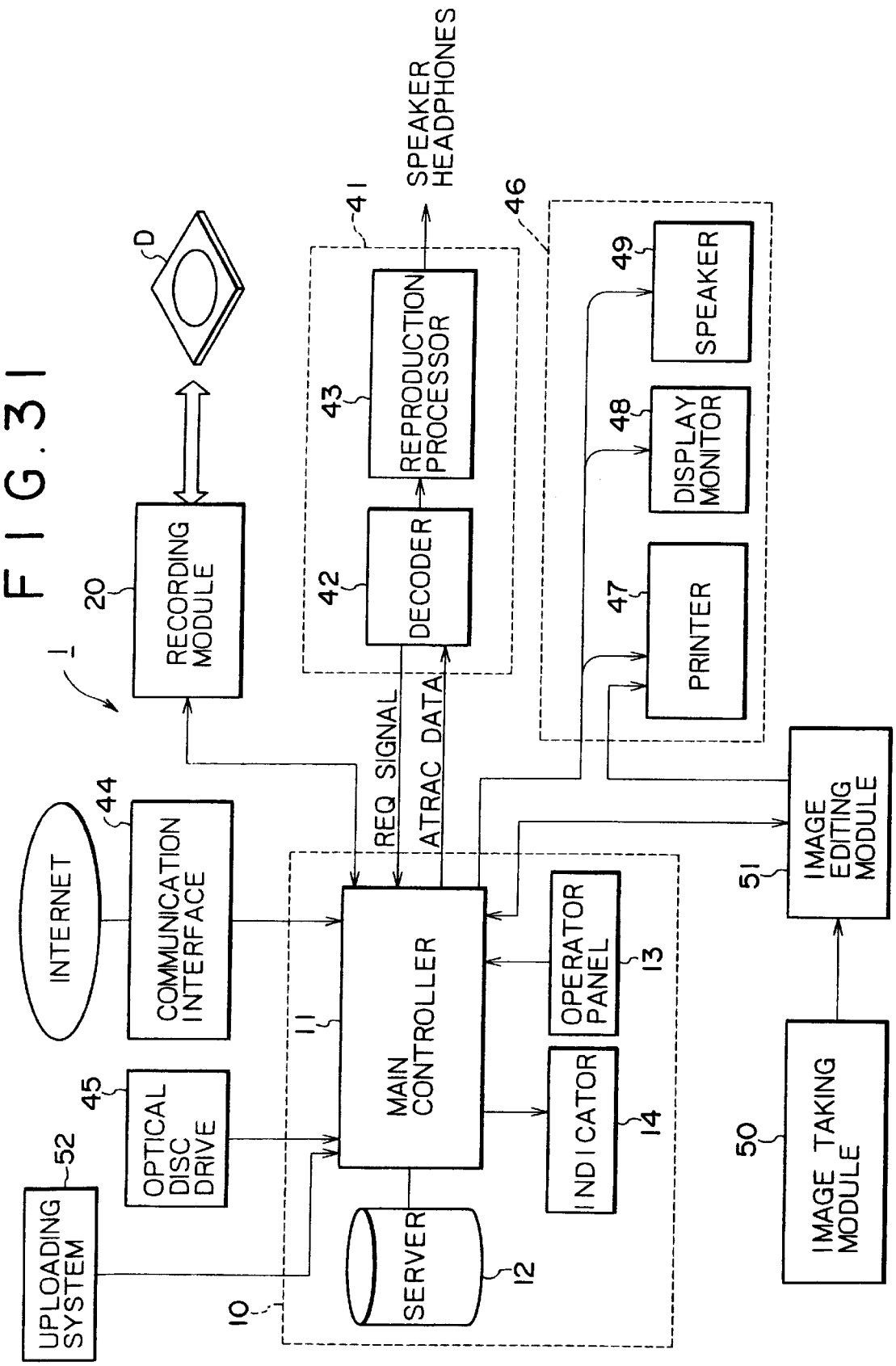

DUBBING APPARATUS

This application is a division of U.S. patent application Ser. No. 09/131,094 Aug. 7, 1998 now U.S. Pat. No. 6,388,766 B1.

BACKGROUND OF THE INVENTION

1. Field of the Invention

The present invention generally relates to a dubbing apparatus for dubbing any audio data from a mass storage medium installed at an information center or in the dubbing apparatus onto a recording medium and, more particularly, to a dubbing apparatus having a printing module for printing information associated with audio data to be dubbed on a recording medium.

2. Description of Related Art

A magneto-optical disc called a Mini Disc (trademark) is known which is a recording/reproducing enabled disc recording medium having a diameter of about 64 mm and housed in a cartridge.

This magneto-optical disc can record about 74 minutes of audio data in stereo by use of ATRAC (Adaptive Transform Acoustic Coding) as audio compressing.

Since the magneto-optical disc is small in size and therefore convenient in transportation, it is easy for outdoor use. Also, unlike an ordinary audio disc called a Compact Disc (trademark), this magneto-optical disc allows recording, thereby duplicating audio data.

An audio server system is possible in which, in order to record audio data compressed at a compression ratio of about 5 to 1 onto a magneto-optical disc, the compressed audio data is stored without change in a server, thereby making it possible to down load the compressed audio data to an optical disc fitted to a client computer without use of a decoder and an encoder.

In such an audio server system, the compressed data is recording without decompressing, so that the recording time required by this audio server system is shorter than other audio server system in which compressed audio data is decompressed before compressing again.

In the above-mentioned audio server system, a magneto-optical disc brought by the user is loaded in this audio server system. The user selects desired one or more pieces of music from among those recorded in the server as audio data and dubs the selection onto the magneto-optical disc, thereby realizing a new form of music sale which is different from a package medium such as a CD (Compact Disc).

Generally, the package medium such as a CD is sold with an added value including a lyrics card, liner notes by critic, a cover photograph, and a producer comment, in addition to music content.

However, a system in which audio data is distributed from the above-mentioned server to a client only records music content onto a recording medium without the above-mentioned added value. Therefore, such an audio server system has a drawback in satisfying users in content provision, as compared with ordinary package media.

It is therefore an object of the present invention to provide a dubbing system capable of providing added value information equal or superior to that of the ordinary package media.

SUMMARY OF THE INVENTION

In carrying out the invention and according to one aspect thereof, there is provided an audio dubbing system for dubbing a desired audio program selected from a memory storing one or more compressed audio programs onto a recording medium, comprising a recording means for recording an audio program supplied from the memory onto the recording medium; a receiving means for receiving associated information about the supplied audio program; and a printing means for printing the associated information received by the receiving means.

BRIEF DESCRIPTION OF THE DRAWINGS

These and other objects of the invention will be seen by reference to the description, taken in connection with the accompanying drawing, in which:

FIG. 2 is a diagram illustrating a data structure on a magneto-optical disc for use in the first preferred embodiment;

FIGS. 3A, 3B, 3C, and 3D are diagrams illustrating a cluster format on the above-mentioned magneto-optical disc;

FIG. 4 is a diagram illustrating a data structure corresponding to U-TOC sector 0, a control area on the above-mentioned magneto-optical disc;

FIG. 8 is a diagram illustrating a data structure of U-TOC sector 1, a control area on the above-mentioned magneto-optical disc;

FIG. 9 is a diagram illustrating a data structure of U-TOC sector 2, a control area on the above-mentioned magneto-optical disc;

FIG. 10 is a diagram illustrating a data structure of U-TOC sector 4, a control area on the above-mentioned magneto-optical disc;

FIG. 11 is a block diagram illustrating details of a recording module 20 shown in FIG. 1;

FIG. 12A is a block diagram illustrating a state of connection between an audio sending module 10 and the recording module 20 in the above-mentioned first preferred embodiment;

FIG. 12B is a timing chart indicative of the processing timing at the recording module side between compressed audio data ATRAC sent from the audio sending module 10 to the recording module 20 and a request signal Data Req sent from the recording module 20 to the audio sending module 10;

FIG. 12C is a timing chart indicative of the processing time at the recording module side between a command signal Command sent from the audio sending module 10 to the recording module 20 and an acknowledge signal ACK sent from the recording module 20 to the audio sending module 10;

FIG. 15A is a timing chart indicative of compressed audio data ATRAC to be sent from the audio sending module 10 to the recording module 20;

FIG. 15B is a timing chart indicative of a request signal Data Req to be sent from the recording module 20 to the audio sending module 10;

FIG. 15C is a timing chart indicative of a command signal Command to be sent from the audio sending module 10 to the recording module 20;

FIG. 15D is a timing chart indicative of a acknowledge signal ACK to be sent from the recording module 20 to the audio sending module 10;

FIG. 15E is a timing chart indicative of the processing timing on the recording module side;

FIG. 16A is a timing chart indicative of a command signal Command to be sent from the audio sending module 10 to the recording module 20;

FIG. 16B is a timing chart indicative of an acknowledge signal ACK to be sent from the recording module 20 to the audio sending module 10;

FIG. 16C is a timing chart indicative of the processing timing at the recording module side;

FIG. 16D is a schematic diagram illustrating contents of control information TOC formed on the optical disc D;

FIG. 17A is a timing chart indicative of a command signal Command to be sent from the audio sending module 10 to the recording module 20;

FIG. 17B is a timing chart indicative of an acknowledge signal ACK to be sent from the recording module 20 to the audio sending module 10;

FIG. 17C is a timing chart indicative of the processing timing at the recording module side;

FIG. 17D is a schematic diagram illustrating contents of control information TOC formed on the optical disc D;

FIG. 18A is a timing chart indicative of a command signal Command to be sent from the audio sending module 20 to the recording module 10;

FIG. 18B is a timing chart indicative of an acknowledge signal ACK to be sent from the recording module 20 to the audio sending module 10;

FIG. 18C is a timing chart indicative of the processing time at the recording module side;

FIG. 18D is a schematic diagram illustrating contents of control information TOC formed on the optical disc D;

FIG. 19 is a diagram illustrating contents recorded on the optical disc D;

FIG. 25 is a table indicative of a particular example of associated information according to the present invention;

FIG. 29 is a schematic diagram illustrating the label to be printed in the audio dubbing system practiced as the first preferred embodiment and attached to the cartridge;

FIG. 31 is a block diagram illustrating an audio dubbing system practiced as a second preferred embodiment of the invention.

DETAILED DESCRIPTION OF PREFERRED EMBODIMENTS

Figure 1:
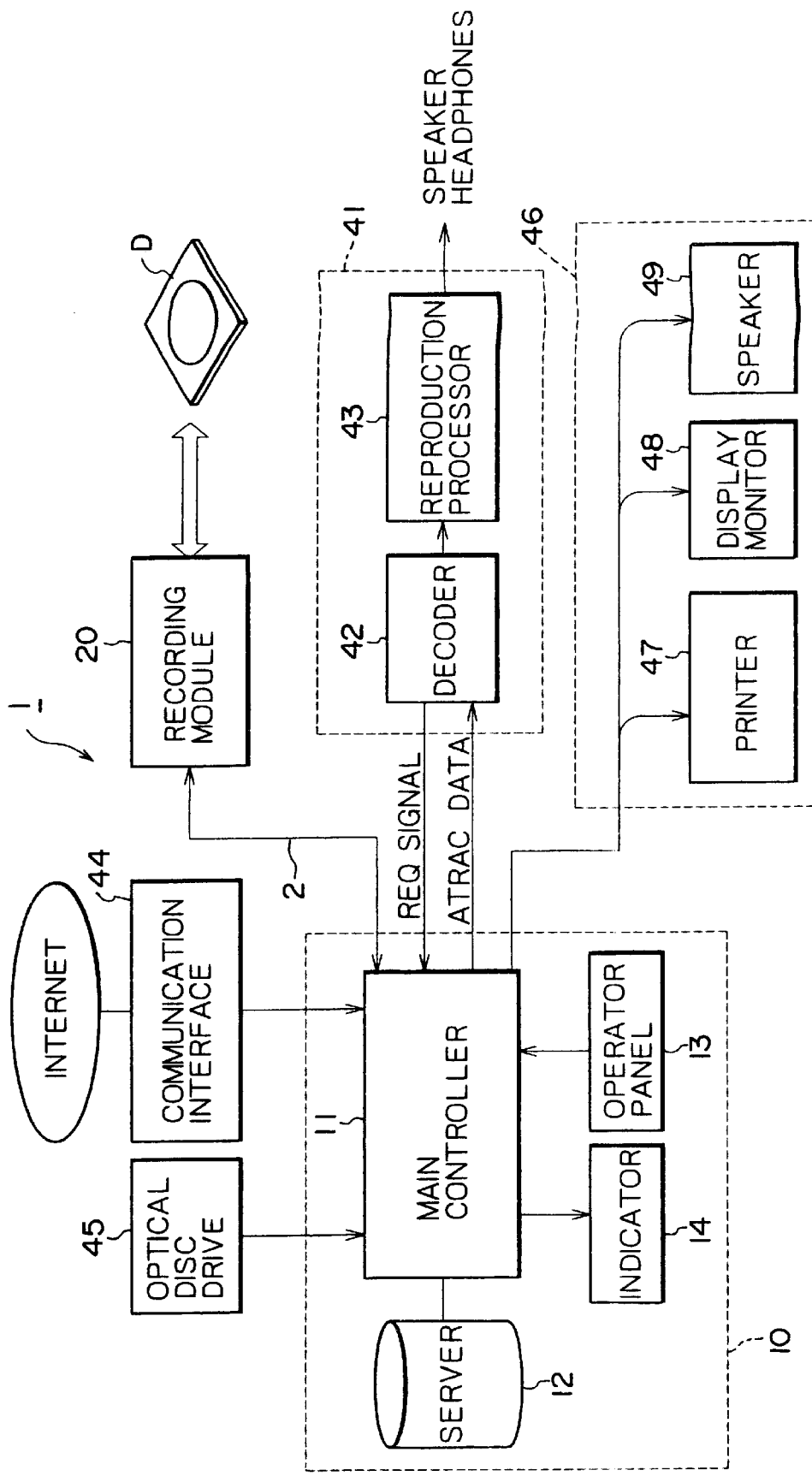
FIG. 1 is a block diagram illustrating a dubbing system in its entirety practiced as a first preferred embodiment of the invention.

This invention will be described in further detail by way of example with reference to the accompanying drawings. The following describes, in the order shown below, an audio dubbing system constituted by use of a Mini Disc system, this audio dubbing system being practiced as one preferred embodiment of the invention:

1. Constitution of the audio dubbing system
2. Cluster format of a Mini Disc
3. U-TOC
4. Audio data transmission method
5. TOC information transmission method
6. Audio data and TOC information dubbing operation
7. Monitoring at audio dubbing
8. Printing associated information
9. Print output including camera images 1. Constitution of the Audio Dubbing System FIG. 1 shows a constitution of the audio dubbing system practiced as one preferred embodiment of the invention. An audio dubbing system 1 has an audio sending module 10 and a recording module 20 as fundamental portions for executing an audio dubbing operation. The audio sending module 10 has a main controller 11, a server 12, an operator panel 13, and an indicator 14. The recording module 20 records audio data onto a disc D, which is a portable recording medium. The audio sending module 10 and the recording module 20 are interconnected by a connection cable 2.

The audio dubbing system 1 stores audio data in the server 12 in the audio sending module 10 beforehand. The user selects a desired piece of audio data from the audio data stored in the server 12 and records the selected audio data onto the user's disc D for example.

To be more specific, the audio dubbing system 1 does not distribute content (music for example) in the form in which audio data is stored in a recording medium such as a so-called Compact Disc or an audio tape but distributes the content by recording audio data onto a recording medium (the disc D) owned by user. For example, the audio dubbing system 1 may be installed in a station or a store to offer music content to users charged or without charge. The audio dubbing system 1 may also be installed in a music stadium for example to executed content management.

First, the server 12 of the audio dubbing system 1 stores music content equivalent to pieces of music each being several minutes long as audio data; for example, top 100 numbers on a recent hit chart are stored. Each piece of the music content is recorded as compressed data based on the above-mentioned ATRAC.

The user checks, through the indicator 14, the content to be offered by the audio dubbing system 1 and, if desired content is found, operates the operator panel 13 to select one or more pieces of content. Next, the user loads his or her own disc D into the recording module 20 and performs an operation on the operator panel 13 to start a recording operation.

When the user has completed the recording start operation, the main controller 11 of the audio sending module 10 supplies the audio data of selected content from the server 12 to the recording module 20. The recording module 20 records the audio data supplied from the audio sending module 10 onto a free area of the disc D. Then, the audio dubbing system 1 completes the content providing operation when the audio data of the desired content has been recorded on the disc D.

In this embodiment, it is assumed that the disc D be a disc in the Mini Disc system and ATRAC (Adaptive Transform Acoustic Coding) audio data compressed at a ratio of 5 to 1 be recorded on the disc. Therefore, the ATRAC audio data stored in the server 12 can be dubbed from the server 12 onto the disc D as compressed without requiring encoding and decoding necessary for compressing and decompressing the data. This shortens the time for audio data recording as compared with the recording in which audio data is recorded while being decompressed.

As shown, the audio dubbing system 1 further has a reproducing module 41, an associated information reproducing module 46, a communication interface 44, and an optical disc drive 45. The reproducing module 41 has a decoder 42 and a reproduction processor 43. The associated information reproducing module 46 has a printer 47, a display monitor 48, and a speaker 49.

The audio dubbing system 1 dubs audio data onto the disc D and, at the same time, performs various other operations by use of the reproducing module 41, the associated information reproducing module 46, the communication interface 44, and the optical disc drive 45. For example, audio data to be recorded onto the disc D is reproduced by the reproducing module 41 to be outputted to a speaker or headphones and the associated information of the audio data to be recorded is outputted from the associated information reproducing module 46. In this case, a part of the compressed audio data coming from the audio sending module 10 is decoded by the decoder 42, thereby allowing the user check (or monitor) the music to be dubbed.

In the reproducing module 41, the decoder 42 decompresses the ATRAC data supplied from the main controller 11 to generate audio data. The resultant audio data is supplied from the decoder 42 to the reproduction processor 43. The reproduction processor 43 performs processing for converting a digital signal into an analog signal and amplification processing to generate an analog audio signal. The analog audio signal generated by the reproduction processor 43 is supplied to the speaker or the headphones to be outputted as an audio signal. The reproducing module 41 enables audio output as a monitor audio signal for the user to dub audio data.

The communication interface 44 is a modem or a terminal adapter for ISDN (Integrated Services Digital Network) for example. The main controller 11 can access image information, audio information, and text information from a WWW (World Wide Web) site through the communication interface 44.

The optical disc drive 45 is a device for reproducing an optical disc such as a video CD, a CD-ROM, or a DVD. The main controller 11 can obtain, by means of this optical disc drive 45, image information, audio information, and text information recorded on a CD-ROM for example.

The printer 47 of the associated information reproducing module 46 prints image information or text information supplied from the main controller 11. The display monitor 48 displays image information and text information supplied from the main controller 11. It should be noted that the display monitor 48 may be the indicator 14 of the audio sending module 10. The speaker 49 outputs audio information supplied from the main controller 11. It should be noted that the speaker 49 may be the speaker or the headphones that output an audio signal outputted from the reproducing module 41.

The server 12 stores the ATRAC data of plural pieces of content as described above. The server 12 also stores, for each piece of content, a list of a portion of the ATRAC data so that this portion may be monitored when the same is supplied to the reproducing module 41 to be recorded.

The server 12 also stores, for each piece of content, a photograph of the creator of that content and an image of that music. The server 12 also stores text data such as the lyrics of each content and the history of the creator for example. If such a creator photograph or a motion picture is stored on a video CD or an Internet home page, the server 12 also stores the chapter number of such a video CD or the address of URL (Uniform Resource Locator). Namely, the main controller 11 can obtain image information and character information for each piece of content as the associated information and output an image and a text from the associated information reproducing module in the form of print, display, or audio to the user.

In order to record the track selected by the user onto the disc D, the main controller 11 supplies a predetermined portion of the ATRAC data to the reproducing module 41 when supplying the ATRAC data from the server 12 to the recording module 20. This allows the user to listen to the music being recorded while the recording module 20 is recording the ATRAC data. However, because the ATRAC data is compressed at a ratio of about 5 to 1, an attempt to reproduce the entire music while recording the same cannot reproduce all the data with respect to time. Namely, a piece of music that plays for five minutes for example takes about one minute for recording, so that only one minute can be used for monitoring. Therefore, the main controller 11 extracts a part of the ATRAC data to be recorded and supplies the extracted part to the reproducing module 41.

The ATRAC data to be supplied to the reproducing module 41 is the extracted portion such as the prelude, digest, bridge, or postlude for example of a piece of music. This extracted portion is set to the server 12 beforehand. Also, data not directly associated with the ATRAC data to be recorded may be supplied to the reproducing module 41 for output. Such data includes another piece of music performed by the creator of the music to be recorded.

In FIG. 1, the server 12 is arranged in the audio sending module 10. Alternatively, the server 12 may be arranged in a remotely located information center for example. In this case, the main controller 1, the indicator 14, the operator panel 13, and the recording module 20 may be arranged in one housing to make communication with the remote server 12 by means of ISDN or telephone line.

2. Cluster Format of Mini Disc

The following describes a magneto-optical disc on which data can be both recorded and reproduced, the magneto-optical disc being specified in the format called a Mini Disc (trademark) as a recording medium (the disc D) for use in the audio dubbing system 1.

A magneto-optical disc called a Mini Disc for use as the disc D in the present embodiment is a recording medium having a diameter of about 64 mm accommodated in a cartridge. This magneto-optical disc can store about 74 minutes of audio data when ATRAC (Adaptive Transform Acoustic Coding) for audio is used as audio compressing.

The audio dubbing system 1 records audio data compressed by ATRAC onto the disc D, so that the audio data of the content to be stored in the server 12 is compressed by ATRAC beforehand and the audio dada thus compressed is recorded directly onto the optical disc D without use of a decoder and an encoder (hereafter, the audio data compressed by ATRAC is referred to as ATRAC data). Consequently, the connection cable 2 for transmitting audio data from the audio sending module 10 to the recording module 20 transmits ATRAC data. It should be noted that the connection cable 2 also transmits control commands and command data (Command) such as TOC information of the disc D, which will be described later.

The following describes the format of the data recorded on the disc D (or a Mini Disc) for use in the audio dubbing system 1. The data recorded on the disc D is controlled in units of cluster as shown in FIG. 2. On the disc D, data is written in an integral multiple of this cluster. When ATRAC data recorded in one cluster is reproduced, about 2.04 seconds of a audio signal results.

One cluster is composed of a total of 36 sectors including three linking sectors, one sub data sector, and 32 main sectors (for use in recording ATRAC data and TOC information). It should be noted that one sector is made up of 2352 bytes of data.

The linking sector is a sector assigned such that interleaving of error correction processing is completed within the cluster because this error correction processing is based on ACIRC (Advanced Cross-Interleaved Reed-Solomon Code). Namely, the linking sector is a discard sector provided in consideration of the interleaving in the error correction processing so that data can be rewritten on a cluster basis. The sub data sector provides a reserved area.

The disc D handles 424 bytes of ATRAC data in units called a sound group as shown in FIG. 3C. In this sound group, 212 bytes of data are assigned to each of the left and right channels as shown in FIG. 3D. When the compressed data in units of this sound group is decompressed, data equivalent to 512 samples for the left and right channels is obtained. These 512 samples of data correspond to 2048 bytes of data. To be more specific, 512 samples×16 bits×2 channels/8=2048 bytes. These 11 sound groups comprise 2 sectors as shown in FIGS. 3B and 3C.

3. U-TOC

The recording area of the disc D is divided into a program area in which ATRAC data is recorded, a U-TOC (User Table of Contents) in which control data for controlling the audio data recorded in this program area is recorded, and a P-TOC (Pre-mastered Table of Contents), which is a lead-in area.

In the disc D, a particular piece of music can be erased or edited only by rewriting U-TOC information, which is control information, without erasing actual audio data. For example, if the third piece of music is to be erased from the disc D in which a total of five pieces of music are recorded, the third piece of music becomes unreproducible by controlling as a recordable area the slot recorded with the start and end addresses of the third piece of music. In other words, to record ATRAC data onto the disc D, this U-TOC information must be rewritten at the same time. The following describes the U-TOC. It should be noted that units in which audio data is recorded onto the disc D is hereafter referred to as a track. The track is a unit of music for example and corresponds to the music content to be provided by the above-mentioned audio dubbing system 1.

The U-TOC on the disc D can use 32 sectors, U-TOC sector 0 through U-TOC sector 31. Of these sectors, sectors 0 through 4 have already been specified. The U-TOC sectors 0, 1, 2, and 4 will be described in detail.

FIG. 4 shows data to be recorded in U-TOC sector 0. For convenience, the data recorded in U-TOC sector 0 is divided into 1-byte slots. Each slot is identified by a value (x) 0 to 587 along the vertical axis in FIG. 4 and a slot number (y) 1 to 4 along the horizontal axis; namely, (x=row, y=number). This holds true with U-TOC sector 1 and on.

U-TOC sector 0 is recorded with 12 byte of header data followed by "Cluster H," "Cluster L," and "Sector" indicative of address information of TOC sector 0 in 3 bytes starting from slot (row 3, number 1). Identification code "Model" indicative of a mini disc system is recorded in slot (row 3, number 4). starting from slot (row 7, number 1), "Maker code" indicative of the manufacturer of this disc D, "Model code" indicative of the model of the disc D, "First TNO" indicative of the track number of the first track of the disc D, and "Last TNO" indicative of the track number of the last track are recorded. In slot (row 8, number 4), "Used Sectors" indicative of sector usage status is recorded. In slot (row 10, number 1), "Disc Serial No" indicative of the serial number of the disc D is recorded.

Starting from slot (row 11, number 1), "Disc ID" indicative of disc ID number, "P-DFA (pointer for defect area)," a pointer indicative of a slot recorded with the start address of an area for recording address information of a defect caused on the disc D, "P-EMPTY (pointer for empty slot)," a pointer indicative of slot usage state, and "P-FRA (pointer for free area)," a pointer indicative of a slot recorded with the start address of an area for controlling recordable areas are recorded. Subsequently, "P-TNOn," a pointer indicative of a slot recorded with the start address of each track recorded on the disc D is recorded up to slot (row 75, number 4) inclusive. In this pointer, n is an integer 1 to 255 and denotes the number of each track. For the track control pointer P-TNOn, P-TNO0 through P-TNO255 are prepared, allowing up to 255 tracks to be recorded on the disc D.

Starting from slot (row 78, number 1), the start address of each track, the end address of each track, link information link-P, and track mode are recorded with 8 bytes being one table. U-TOC sector 0 has 255×4×2 slots (255 tables) in which these start and end addresses are recorded. In each table, the start and end addresses of the track indicated by the corresponding pointer are recorded. The values recorded in the above-mentioned pointers P-DFA, P-EMPTY, and P-FRA each indicates one of the 255 slots.

Figure 5:
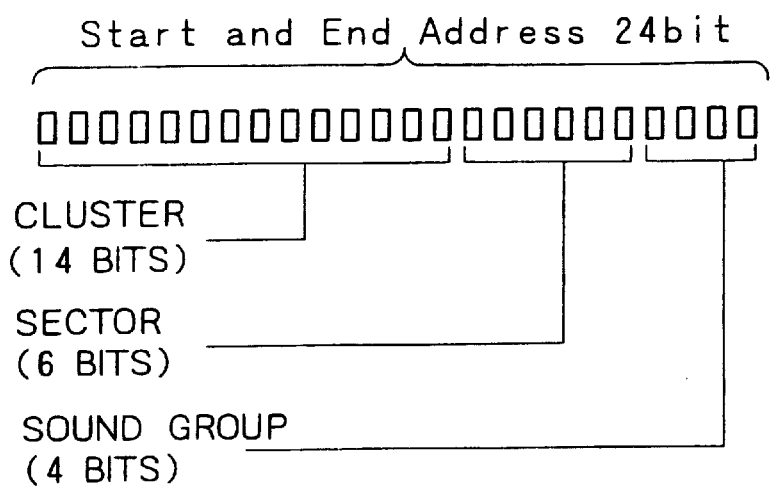
FIG. 5 is a diagram illustrating a data structure of one slot on U-TOC, a control area on the above-mentioned magneto-optical disc.

The start and end addresses in each slot are represented by data of 3 bytes=24 bits as shown in FIG. 5. These start and end addresses are composed of a cluster address in the first 14 bits, a sector address in the next 6 bits, and a sound group address in the last 4 bits.

Figure 6:
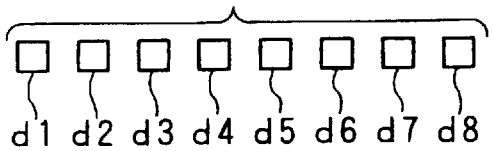
FIG. 6 is a diagram illustrating a data structure of track mode on U-TOC, a control area on the above-mentioned magneto-optical disc.

The track mode is represented in data of 1 byte=8 bits as shown in FIG. 6. This track mode is recorded with recording protect information at bit 1, duplication protect information at bit 2, generation information at bit 3, audio information at bit 4, erase storage information at bits 5 and 6, monaural or stereo information at bit 7, and emphasis information at bit 8. Namely, this track mode stores associated information unique to each track.

The link information P-Link is a pointer that indicates, if a same track is not recorded on the disc D in a continuous data stream, namely a same track is recorded in the recording area of the disc D in a discrete manner, from which start address the next data is recorded. For example, if, in reproducing one track, data recorded from the start address of the table of slot (row 586, number 1) must be reproduced subsequent to the end address represented in the table from slot (row 78, number 1), the link information Link-P of slot (row 80, number 4) indicates slot (row 586, number 1).

Namely, on the disc D, data need not always be recorded in a continuous form, or in a continuous data stream; a sequential data string may be recorded in a discrete manner. Discrete recording also indicates the continuity of data by this link information P-Link. In reproduction, storing the read data into memory once and making the rate of writing to memory faster than the rate of reading from memory can reproduce the continuous data without interruption.

When data shorter than a recorded program is written over recorded data, an excess portion need not be erased and can be specified as a recordable area (P-FRA) for efficient recording.

Figure 7:
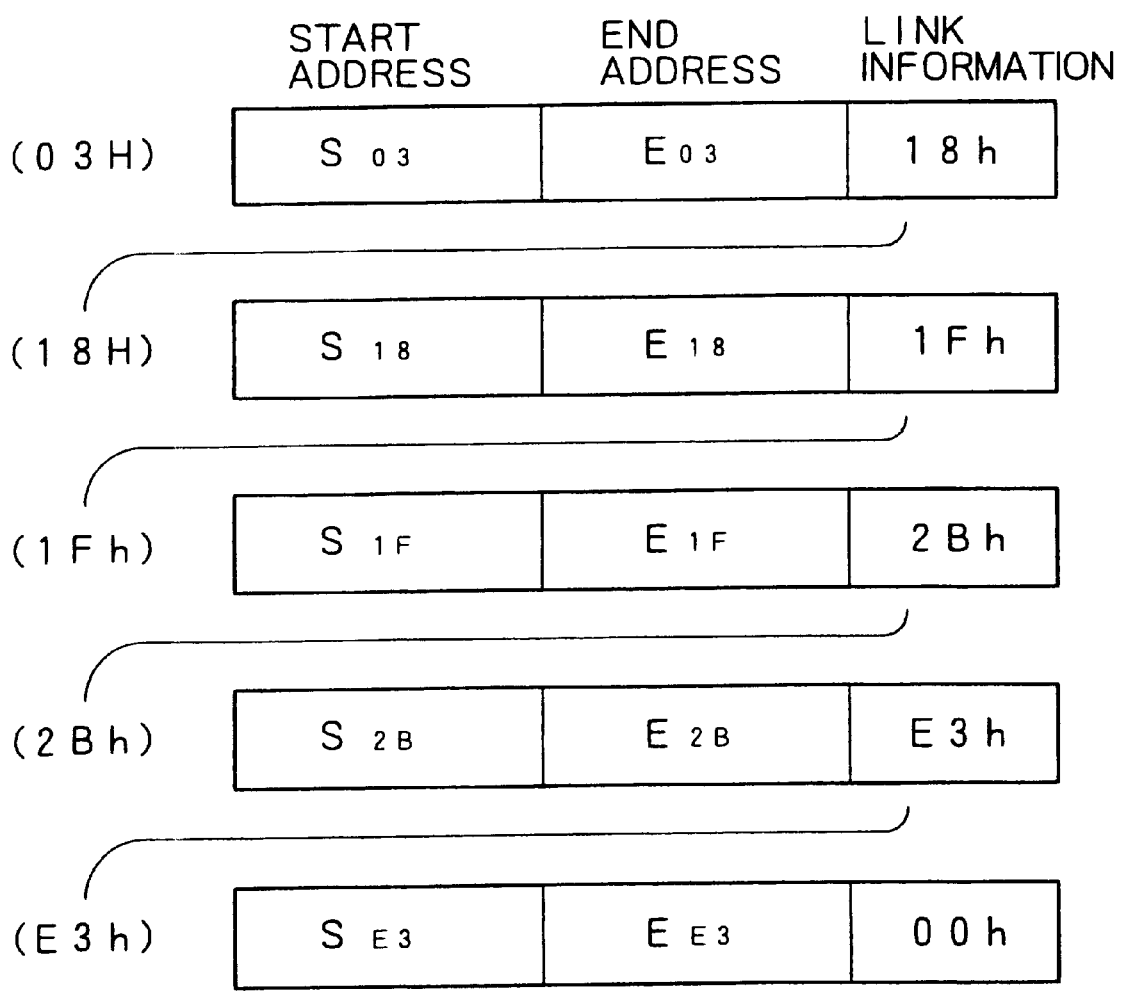
FIG. 7 is a schematic diagram illustrating a link state of slots on U-TOC, a control area on the above-mentioned magneto-optical disc.

The following describes a method of linking discrete areas by use of an example of the pointer P-FRA, which is a recordable area, with reference to FIG. 7. If the pointer P-FRA indicative of the start position of the slot controlling the recordable area of U-TOC0 is recorded with 03h (hexadecimal) for example, access is first made to the slot corresponding to this 03h. It should be noted that 03h indicates an area (a table) of 8 bytes from the slot (row 82, number 1).

The value of the pointer indicates a particular slot by performing predetermined computation by use of the value. Namely, let the pointer value be P, then a byte position is indicated as 304+P×8. Therefore, the above-mentioned 03h is 304+3×8=328, which is equivalent to the byte position (82×4=328) of slot (row 82, number 1). Each pointer and each link information specify a slot of this form.

The start address and end address data recorded in slot 03h indicate the start address and the end address of one part in a track recorded on the disc. The link information recorded in slot 03h indicates a slot number that follows. In this case, 18h is recorded.

A range defined by the start address and the end address of slot 18h indicated by the link information of slot 03h is determined a recordable area. In addition, following slot 1Fh described in the link information of slot 18h, a range defined by the start address and the end address of slot 1Fh is determined a recordable area. Further, following slot 2Bh described in the link information of slot 1Fh, a range defined by the start address and the end address of slot 1Fh is determined a recordable area. Thus, slots are followed by following the slot addresses recorded in the link information until the link information becomes 00H.

Thus, starting from the slot indicated by pointer P-FRA, slots are followed until the link information becomes null (=00H), thereby linking parts, which are free areas discretely recorded on the disc, in memory. In the above description, pointer P-FRA is used for example. Pointers P-DFA, F-EMPTY, P-TNO0 through P-TNO255 can also link discretely recorded parts. For example, in the case of pointers P-TNO0 through P-TNO255, parts discretely recorded on the disc, which constitute one track, can be linked in memory.

FIG. 8 shows data to be recorded in U-TOC sector 1. In U-TOC sector 1, the titles of tracks recorded in the program area and the tile of the entire disc are controlled. The title of the entire optical disc D provides information such as an album title and a performer name if the track to be recorded is audio data, the title of each track being equivalent to a title of music.

Character information of each track is recorded in a slot indicated by pointer P-TNAn (n being 1 to 255) from slot (row 12, number 2). If there are too many characters, the character information is recorded over plural linked slots by use of link information.

FIG. 9 shows data to be recorded in U-TOC sector 2. In U-TOC sector 2, the recording date for each program recorded in the program area is controlled in the same form as that of the above-mentioned U-TOC sector 0. Namely, the recording date and so on of each track are recorded in a slot indicated by pointer P-TRDn (n being 1 to 255) from slot (row 12, number 2).

FIG. 10 shows data to be recorded in U-TOC sector 4. In U-TOC sector 4, the title of each track recorded in the program area and the title of the entire disc are recorded as with U-TOC sector 1. However, U-TOC sector 4 is set as a recording area for character information based on kanji and European characters as fonts. The form of control is the same as that of the above-mentioned U-TOC sector 1. To indicate the type of the recorded characters, "char code" is recorded in slot (row 10, number 4).

4. Audio Data Transmission Method

The following describes a dubbing operation to be executed by the audio dubbing system 1 with reference FIG. 11 which shows a detailed constitution of the recording module 20 shown in FIG. 1.

As shown, the recording module 20 comprises a memory controller 21 supplied with data from the audio sending module 10 to control a RAM (Random Access Memory) 22, an encoder/decoder 23 for encoding and decoding data, a magnetic head drive 24 for driving a magnetic head 25, an optical pickup 26 for radiating a laser beam onto the disc D and sensing the reflected beam, an RF amplifier 27 for reproducing from the reflected beam sensed by the optical pickup 26 a focus error signal (FE), a tracking error signal (TE), and a magneto-optical reproduction signal (MO), an address decoder 28 for reproducing a signal corresponding to a groove wobble formed in a guide groove of the optical disc based on a push-pull signal (PP) from the RF amplifier 27 to decode an absolute address, a spindle motor 29 for rotably driving the disc D, and a threading mechanism 30 for driving the optical pickup 26 in the radial direction of the disc D.

Further, the recording module 20 comprises a servo circuit 31 for controlling focus servo, tracking servo, threading servo, and spindle servo based on the focus error signal (FE) and the tracking error signal (TE) supplied from the RF amplifier 27 and a system controller 32 for controlling the memory controller 21, the encoder/decoder 23, and the servo circuit 31.

The optical pickup 26 radiates a laser beam from a laser diode to the optical disc D through an objective lens. The optical pickup 26 also senses the laser beam reflected from the disc D by means of a photo detector and supplies the detected current to the RF amplifier 27. The RF amplifier 27, based on the detected current supplied from the optical pickup 26, generates a focus error signal (FE), a tracking error signal (TE), a magneto-optical reproduction signal (MO), and a push-pull signal (PP). The RF amplifier 27 supplies the generated focus error signal (FE) and tracking error signal (TE) to the servo circuit 30, the generated push-pull signal (PP) to the address decoder 28, and the generated magneto-optical reproduction signal (MO) to the encoder/decoder 23.

The servo circuit 31, based on the supplied focus error signal (FE) and tracking error signal (TE), drives the objective lens through a biaxial mechanism of the optical pickup 26 to perform tracking and focus servo control on the laser beam to be radiated onto the magneto-optical disc. The servo circuit 31, based on the tracking error signal (TE), drives the threading mechanism 30 to perform threading servo control by which the optical pickup 26 is driven in the radial direction of the disc D. The servo circuit 31, based on a spindle error signal supplied from a detector, not shown, for detecting the rotation of the disc D, performs spindle servo control to drive the spindle motor 29 such that the disc D is kept a constant linear velocity (CLV).

The address decoder 28 reproduces address information from a so-called wobble signal (the push-pull signal PP) corresponding to the wobbling groove formed in the guide groove of the optical disc D.

The encoder/decoder 23, as processing of reproducing signals from the disc D, digitizes the magneto-optical reproduction signal (MO) supplied from the RF amplifier 27, demodulates the digitized signal based on EFM (Eight-to-Fourteen Modulation), and decodes the demodulated signal based on CIRC (Cross Interleaved Reed-Solomon Coding). The encoder/decoder 23, as processing for recording signals onto the disc D, adds an error correction code based on CIRC to a recording signal supplied from the memory controller 21 and modules the resultant signal based on EFM, supplying the resultant modulated signal to the magnetic head drive 24.

The magnetic head drive 24 drives the magnetic head 25 based on the recording signal supplied from the encoder/decoder 23 to apply a modulation magnetic field to the disc D for signal recording. In recording the signal, the optical pickup 26 performs high-level laser output so that magnetic field information is held on the recording surface of the disc by the magnetic head 25.

The memory controller 21 controls ATRAC data to be stored in the random access memory 22. To be more specific, the memory controller 21 stores the ATRAC data supplied from the audio sending module 10 into the random access memory 22 temporarily and then supplies the ATRAC data to the encoder/decoder 23. The system controller 32 controls the recording module 20 in its entirety; for example, the memory controller 21, the encoder/decoder 23, and the servo circuit 31. The system controller 32 also controls the circuits that transfer control data with the audio sending module 10, which will be described later in detail.

Thus constituted, the recording module 20 of the audio dubbing system records the ATRAC data supplied from the audio sending module 10 onto the disc D.

The following describes a method of transferring data between the audio sending module 10 and the recording module 20 of the audio dubbing system 1 with reference to FIGS. 12A through 12C.

In the audio dubbing system 1, the connection cable 2 is arranged between the audio sending module 10 and the recording module 20. As shown in FIG. 12A, this connection cable 2 is composed of an ATRAC line 2a for transmitting ATRAC data from the audio sending module 10 to the recording module 20 and a Data Req line 2b for transmitting an ATRAC data request signal (Data Req) from the recording module 20 to the audio sending module 10.

Over the ATRAC line 2a, the ATRAC data corresponding to the content stored in the server 12 is transmitted from the main controller 11 of the audio sending module 10 to the memory controller 21 of the recording module 20. It should be noted that the ATRAC data is transmitted in units of predetermined size according to the size of the random access memory 22 of the recording module 20. Over the Data Req line 2b, a request signal (Data Req) is transmitted from the system controller 32 of the recording module 20, requesting the main controller 11 of the audio sending module 10 for ATRAC data. Namely, because the ATRAC data is transmitted in units of predetermined size, the recording module 20, if the ATRAC data already transmitted and read in the random access memory 22 has all been written to the disc D, supplies this request signal (Data Req) to the audio sending module 10 for requesting next data.

A particular relationship between this ATRAC data and the request signal (Data Req) is shown in a timing chart of FIG. 12B. If the recording state of the recording module 20 is normal, the recording module 20 first supplies a request signal (Data Req) to the audio sending module 10 at time t11. Receiving the request signal (Data Req), the audio sending module 10 starts supplying a predetermined amount of ATRAC data to the recording module 20 at time t12. Then, receiving the ATRAC data, the recording module 20 stops supplying the request signal (Data Req) at time t13.

If the recording state of the recording module 20 is abnormal, the request signal (Data Req) is not supplied from the recording module 20 to the audio sending module 10 as shown at time t14 to time t15. Consequently, the ATRAC data is not supplied from the audio sending module 10 to the recording module 20. It should be noted that the audio sending module 10, if the request signal (Data Req) is not supplied from the recording module 20 within a predetermined time, discontinues the recording processing.

If the recording module 20 supplies the request signal (Data Req) but does not receive the ATRAC data from the audio sending module 10 within a predetermined time as shown in time t16 to time t17, the recording module 20 is put in a standby state, for example, a recording pause state, waiting for the ATRAC data. Then, when the ATRAC data comes, the recording module 20 starts writing the data as shown at time t17. It should be noted that, if the write standby state continues for a certain period of time, the audio dubbing system 1 determines that some trouble has occurred and discontinues the processing.

Thus, in the audio dubbing system 1, the recording module 20 issues a request signal (Data Req) to the audio sending module 10 for ATRAC data and the audio sending module 10 sends the requested ATRAC data to the recording module 20, thereby providing reliable ATRAC data recording.

5. TOC Information Transmission Method

The audio dubbing system 1, as shown in FIG. 12A, has a command line 2c for transmitting command data such as a control command and TOC information from the audio sending module 10 to the recording module 20 and an ACK line 2d for transmitting an acknowledge signal (ACK) for the command data to be supplied from the recording module 20 to the audio sending module 10.

The command line 2c transmits TOC information generated by the main controller 11 of the audio sending module 10 and command data such as data size of the ATRAC data of each content to the system controller 32 of the recording module 20. The ACK line 2d transmits an acknowledge signal (ACK) indicative of the end of processing from the system controller 32 of the recording module 20 to the main controller 11 of the audio sending module 10 when the recording module 20 has ended the processing based on the command data.

A particular relationship between the command data and the acknowledge signal (ACK) is shown in a timing chart of FIG. 12C. First, the audio sending module 10 supplies predetermined command data to the recording 20 at time t21.

When the command data has been supplied, the recording module 20 performs processing based on the supplied command data at time t22. When this processing based on the command data has ended, the recording module 20 supplies an acknowledge signal (ACK) to the audio sending module 10 at time t23. Then, when this acknowledge signal (ACK) has been supplied, the audio sending module 10 supplies a reset command to the recording module 20 at time t24. When the reset command has been supplied, the recording module 20 stops supplying an acknowledge signal (ACK) at time t25. It should be noted that, if the command data has been supplied, the audio sending module 10 discontinues the processing unless the acknowledge signal (ACK) is supplied from the recording module 20 for a certain period of time, determining that some trouble occurred.

The command data to be supplied from the audio sending module 10 to the recording module through the command line 2c are listed in table 1 below.

TABLE 1

| COMMAND NAME | COMMAND DATA (1 BYTE) | FUNCTION |
|---|---|---|
| SETUP | 01 | PUT THE RECORDING MODULE 20 INTO RECORDING PAUSE STATE. |
| START | 02 | START RECORDING. |
| STOP | 03 | END PROCESSING. |
| TOC0info | 04 | TOC SECTOR 0 INFORMATION (TRACK SIZE, TRACK MODE) |
| TNO | 05 | SPECIFY TRACK NUMBER. |
| ACK-RESET | 08 | ACK RESET. |
| ALRIGHT | 0b | CHECK RECORDING STATE. |
| Title | 83 | TITLE INFORMATION. |

A setup command (SETUP) puts the recording module 20 into a recording standby state, namely a recording pause state. When this setup command (SETUP) is supplied, the recording module 20 is put in the recording pause state. The setup command (SETUP) is given in 1-byte "01" data to be specific.

The start command (START) starts instructs starting of ATRAC data. When the start command (START) is issued, the recording module 20 starts recording the ATRAC data onto the disc D. The start command (START) is given in 1-byte "02" data to be specific.

The stop command (STOP) instructs ending of the processing being performed by the recording module 20 based on another command. When the stop command (STOP) is issued, the recording module 20 stops the recording processed started by the start command (START) for example. The stop command (STOP) is given in 1-byte "03" data to be specific.

The TOC0 information command (TOC0info) instructs recording information onto TOC sector 0 of the disc D. When the TOC0 information command (TOC0info) and information of track size and track mode following this command are supplied, the recording module 20 obtains the start and end addresses of the recorded ATRAC data from the track size and records the TOC data in U-TOC sector 0.

Primarily, the information of U-TOC sector 0 is generated by the recording module 20 based on an executed recording operation and the information thus generated is recorded on the disc D. However, if the ATRAC data of plural pieces of content are supplied from the audio sending module 10 for example, the data of one of the plural pieces of content is supplied to the recording module 20 as a data stream. Therefore, the recording module 20 cannot correctly generate the track information of TOC sector 0. Consequently, a data size indicative of the stream length of the data corresponding to each content and a track mode are supplied from the audio sending module 10 as the TOC0 information command (TOC0info). Based on the information indicated by the TOC0 information command (TOC0info), the recording module 20 generates the information of U-TOC sector 0 to be recorded on the disc D. The TOC0 information command (TOC0info) is given in 1-byte "04" data to be specific.

The track number command (TNO) specifies the track number of the ATRAC data to be recorded. When the track number command (TNO) and a track number following this command are supplied, the recording module 20 performs processing for a subsequent title command for example onto the specified track number. The track number command (TNO) is given in 1-byte "05" data to be specific.

The reset command (ACK-RESET) resets an acknowledge signal (ACK) supplied from the recording module 20. When the reset command (ACK-RESET) is supplied, the recording module 20 stops supplying the acknowledge signal (ACK). The reset command (ACK-RESET) is given in 1-byte "08" data to be specific.

Recording state check command (ALRIGHT) checks the recording state of the recording module 20. When the recording state check command (ALRIGHT) is supplied, the recording module 20 supplies an acknowledge signal (ACK) to the audio sending module 10 if the recording is found normally performed. The recording state check command (ALRIGHT) is given in 1-byte "0b" data to be specific.

The title command (TITLE) gives title information to be recorded on U-TOC sectors 1 and 4 of the disc D. When the title command (TITLE) and character string information and character data following this command are supplied, the recording module 20 records the title information corresponding to tracks onto the U-TOC sectors 1 and 4 of the disc D. The title command (TITLE) is given in 1-byte "83" data to be specific.

6. Audio Data and TOC Information Dubbing Operations

Figure 13:
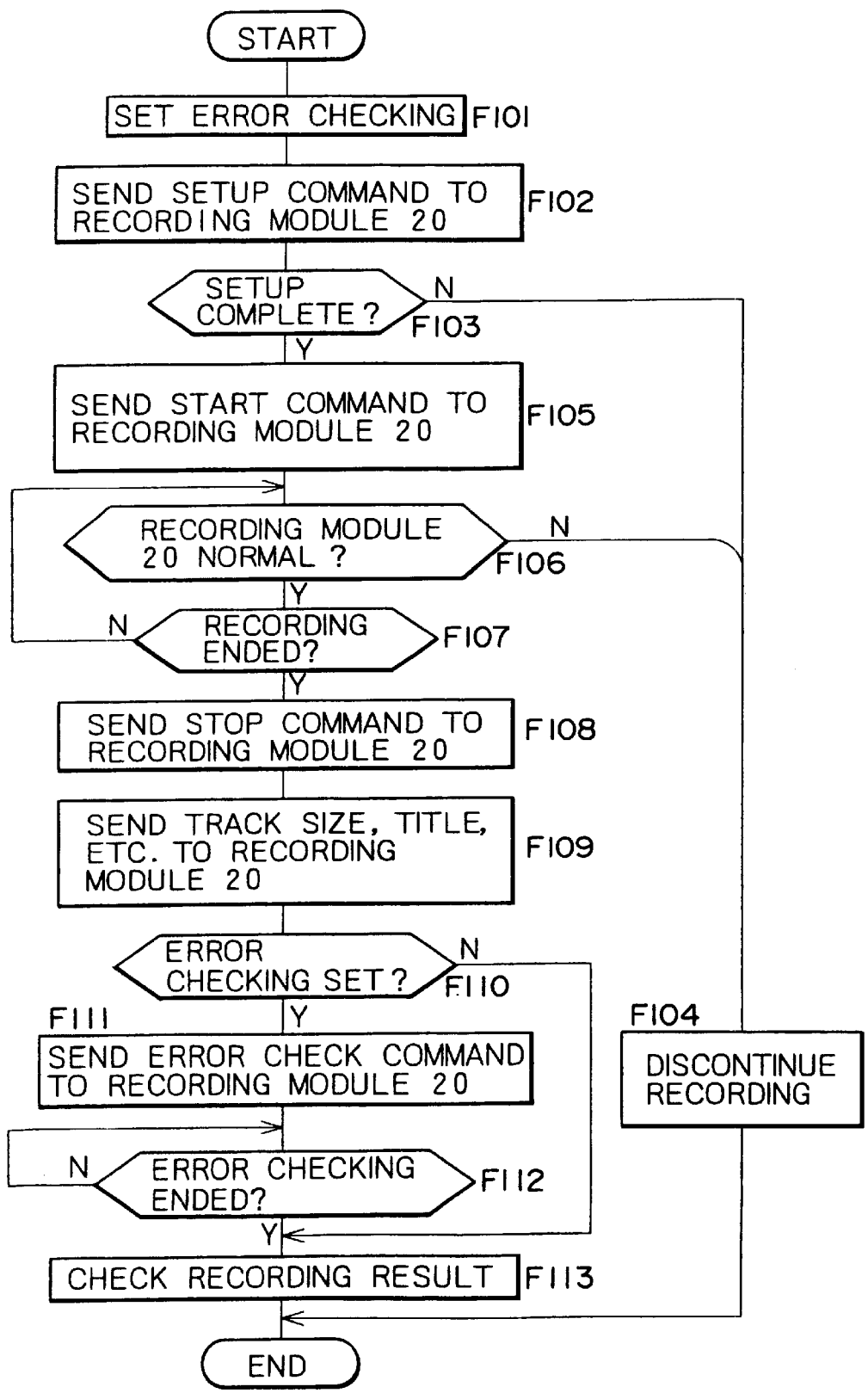
FIG. 13 is a flowchart of dubbing processing to be performed in the recording module 20 in the first preferred embodiment.

The following describes the processing for dubbing by the audio dubbing system 1 with reference to a flowchart shown in FIG. 13. The audio dubbing system 1 starts processing from step F101 shown in FIG. 13 when one or more pieces of content to be recorded from the server 12 onto the disc D have been selected by user and an initial setup operation such as loading the disc D into the recording module 20 has been completed.

In step F101, the audio dubbing system 1 asks the user whether to perform error check through the indicator 14. when the user replies through the operator panel 13, the processing goes to step F102. The error check will be described later.

In step F102, the audio sending module 10 supplies a setup command (SETUP) to the recording module 20 through the command line 2c. Receiving the setup command from the audio sending module 10, the recording module 20 sets the recording state of the disc D to the recording pause state and supplies an acknowledge signal (ACK) to the audio sending module 10 through the ACK line 2d. In step F103, the audio sending module 10 determines whether the acknowledge signal (ACK) has been supplied from the recording module 20. If the acknowledge signal (ACK) is found supplied, the processing goes to step F105. If the acknowledge signal (ACK) is not found supplied from the recording module 20, the processing goes to step F104.

In step F104, the audio sending module 10 determines that some trouble is preventing the recording module 20 from recording onto the disc D and therefore displays an error message on the indicator 14, ending the processing.

In step F105, the audio sending module 10 supplies a start command (START) to the recording module 20 through the command line 2c. When the start command (START) command has been supplied, the recording module 20 supplies a request signal (Data Req) to the audio sending module 10 through the Data Req line 2b. When the request signal (Data Req) has been supplied, the audio sending module 10 supplies ATRAC data in a predetermine size to the recording module 20. When the ATRAC data has been supplied, the recording module 20 records the data in a free area of the disc D.

It should be noted that, if plural tracks namely plural pieces of content are specified by the user, the audio sending module 10 supplies the ATRAC data as one stream to the recording module 20. The recording module 20 stores the U-TOC information of the disc into an external memory for example beforehand so that the disc D state can be returned to the state before recording if the recording to the disc D has failed.

When the recording of the ATRAC data has started in step F105, then the processing goes to step F106. In step F106, the audio sending module 10 supplies a recording state check command (ALRIGHT) through the command line 2c to check the recording state of the recording module 20. When the acknowledge signal (ACK) has been supplied from the recording module 20 to the audio sending module 10 and the recording state is found normal, the processing goes to step F107. In step F107, the audio sending module 10 checks if the recording has ended. If the recording is found not ended, then back in step F106, the audio sending module 10 checks whether the recording is performed normally. Namely, in steps F106 and F107, the audio sending module 10 checks at a certain time interval whether the recording is normally performed and the recording has ended.

If the recording by the recording module 20 is found executed abnormally, the processing goes from step F106 to F104, in which the recording processing is discontinued. At this moment, in order to return the disc D to the state before recording, the U-TOC information stored in the external memory is written to the disc D.

If the recording is found normally executed by the recording module 20 and found ended, the processing goes from step F107 to F108. In step F108, the audio sending module 10 supplies a stop command (STOP) to the recording module 20 through the command line 2c. When the stop command (STOP) has been supplied, the recording module 20 ends the ATRAC data recording processing. When the stop command (STOP) has been supplied in step F108, the processing goes to step F109.

In step F109, the audio sending module 10 supplies necessary TOC information such as a track number command (TNO), a TOC0 information command (TOC0info), track size information, a title command (Title), the number of title characters, and character data.

When the above-mentioned TOC information has been supplied from the audio sending module 10, the recording module 20 records the data in U-TOC sector 0 to sector 4 of the disc D based on the supplied TOC information. It should be noted that the start and end addresses of each track to be recorded in U-TOC sector 0 are generated based on the track size information to be supplied after the TOC0 information command (TOC0info). Namely, because the ATRAC data is supplied as one data stream, this data stream is divided by the data size for each track to generate the TOC information.

When the necessary TOC information has been supplied in step F109, the processing goes to step F110. In step F110, the audio sending module 10 determines whether the user has set that error check is to be performed in step F101. If error check is found set, the processing goes to step F111. If error check is found not set, the processing goes to step F113.

If error checking is to be performed, the audio sending module 10 supplies a error check command to the recording module 20 through the command line 2c in step F111. When the error check command has been supplied, the recording module 20 reads the recorded ATRAC data to check the recorded data for an error. When the error checking by the recording module 20 starts, the audio sending module 10 waits until the error checking ends in step F112. When the error checking has come to an end, the processing goes to step F113.

In step F113, the audio sending module 10 displays the result of the recording on the indicator 14. For example, if the error checking indicates an error in the recorded data, an error message is displayed. It should be noted that, if an error is found in the recorded data, the TOC information before recording stored in the external memory for example is preferably recorded on the disc D to return the disc D to the state before the dubbing operation. When the recording result has been displayed in step F113, the audio dubbing system 1 ends the above-mentioned sequence of dubbing operations.

As described, the audio dubbing system 1 performs the processing of steps F101 through F113, thereby recording the ATRAC data onto the disc D with reliability. It should be noted that, in the processing of steps F101 through F113, the necessary TOC information is supplied to the recording module 20 after the ATRAC data has all been recorded. It is obvious that the TOC information may also be supplied before the audio sending module 10 supplies the ATRAC data to the recording module 20.

Namely, the processing of step F109 is performed after completion of the setup operation and before the start command (START) is supplied, that is to say, between steps F103 and F105. It should be noted that, because the TOC information is recorded after the ATRAC data is recorded onto the disc D, the recording module 20 must store the already supplied TOC information into an external memory or the like.

The audio subbing system 1 may also supply TOC information while the audio sending module 10 is supplying ATRAC data to the recording module 20. Namely, because the data line for supplying ATRAC data and commands is composed of the ATRAC line 2a and the command line 2c, the processing of steps F106 and F107 and the processing of step F109 can be performed concurrently. This concurrent processing shortens the transmission time of the data for the above-mentioned sequence of dubbing operations. It should be noted that, in this case too, the recording module 20 must store TOC information in an external memory beforehand and record the TOC information onto the disc D after recording all the ATRAC data.

In the processing of steps F101 through F113, the ATRAC data corresponding to plural pieces of content are handled as one data stream to separately supply the information necessary for generating the TOC information from the audio sending module 10 to the recording module 20. In addition, in the audio dubbing system 1, if plural pieces of content have been specified by the user, the ATRAC data corresponding to one piece of content may be recorded onto the disc D, the TOC information of the ATRAC data recorded thereafter may be generated and recorded, and then the ATRAC data corresponding to a next piece of content may be recorded. Namely, such processing may be performed by forming a loop in which the processing operations of steps F105 through F109 are repeated for each piece of content.

The following specifically describes the recording of two pieces of music content onto the disc D with reference to a timing charts and other drawings. The server 12 stores many pieces of content such as first content of which title is "ByeBye," track mode (trmd) is "a6," and track size is "0002.00.00," second content of which title is "Hello," track mode (trmd) is "a6," and track size is "0010.2f.0a," third content of which title is "Morning," track mode (trmd) is "86," and track size is "0020.1e.00," and so on as shown in FIG. 14(a).

Figures 14A, 14B:
FIG. 14A is a diagram illustrating control information of music programs stored in the server in the first preferred embodiment.
FIG. 14B is a diagram illustrating control information of music programs recorded on an optical disc D in the first preferred embodiment.

On the other hand, it is assumed that the disc D owned by the user stores two pieces of music as shown in FIG. 14(b); namely, a first track of which title is "Emotion," track mode (trmd) is "e6," and track size is "0011.05.02," and a second track of which title is "Dream," track mode (trmd) is "e6," and track size is "0022.1f.0a."

It is assumed here that the user has loaded the disc D into the recording module 20, selected the second and third pieces of content stored in server 12, and performed an operation for dubbing.

To record the second content (the ATRAC data having title "Hello") and the third piece of content (the ATRAC data having title "Morning") stored in the server 12 onto the disc D, the processing operations shown in FIGS. 15 through 18 are performed.

FIGS. 15A through 15E are timing charts indicative of command data to be transferred between the audio sending module 10 and the recording module 20 for transmitting ATRAC data. First, audio sending module 10 supplies a setup command (SETUP) "01" to the recording module 20 at time t31 as shown in FIG. 15C. When the setup command (SETUP) has been supplied, the recording module 20 sets a recording pause state at time t32 as shown in FIG. 15E and, at the same time, supplies an acknowledge signal (ACK) to the audio sending module 10 as shown in FIG. 15D. When the acknowledge signal (ACK) has been supplied, the audio sending module 10 supplies a reset command (ACK-RESET) "08" to the recording module 20, resetting this acknowledge signal (ACK) as shown in FIG. 15C.

The audio sending module 10 supplies a start command (START) "02" to the recording module 20 at time t33 as shown in FIG. 15C. The supplying of this start command (START) corresponds to the above-mentioned processing of step F105. When the start command (START) has been supplied, the recording module 20 starts, from time t34, a recording operation and, at the same time, supplies an acknowledge signal (ACK) and a request signal (Data Req) to the audio sending module 10.

The audio sending module 10, based on the request signal (Data Req) received at time t34, starts supplying, to the recording module 20, ATRAC data in units of predetermined size, namely the second content (the ATRAC data having title "Hello") and the third piece of content (the ATRAC data having title "Morning") stored in the server 12. Then, to supply the ATRAC data in units of predetermined size, the audio sending module 10 sequentially supplies the data to the recording module 20 based on the request signals (Data Req) supplied at times t35, t36, t37, and t38.

In addition, the audio sending module 10 supplies a recording state check command (ALRIGHT) "0b" at a certain time interval to check whether the recording state of the recording module 20 is normal. This checking of the recording state by the recording state check command (ALRIGHT) corresponds to the above-mentioned processing of step F106. If an acknowledge signal (ACK) comes from the recording module 20 in response to the recording state check command (ALRIGHT), the audio sending module 10 determines that the recording is normal. Then, the audio sending module 10 supplies a reset command (ACK-RESET) "08" to the recording module 20 to reset this acknowledge signal (ACK).

If the audio sending module 10 determines that the ATRAC data have all been supplied to the recording module 20, then the audio sending module 10 supplies a stop command (STOP) "03" to the recording module at time t39 as shown in FIG. 15C. This supplying of the stop command corresponds to the above-mentioned processing of step F108. When the stop command (STOP) has been supplied and the supplied ATRAC data have all been recorded on the disc D, the recording module 20 ends the recording processing at time t40 and, at the same time, supplies an acknowledge signal (ACK) to the audio sending module 10.

FIGS. 16A through 16P are timing charts indicative of a TOC0 information command (TOC0info) to be supplied from the audio sending module 10 to the recording module 20 in the above-mentioned step F110.

To be specific, FIGS. 16A through 16C show timing charts indicative of data to be supplied from the audio sending module 10 to the recording module 20 and FIG. 16D shows a recording state of U-TOC sector 0 of the disc D at each time.

U-TOC sector 0 of the disc D records the start and end addresses and track modes of the already recorded first and second tracks (having titles "Emotion" and "Dream" respectively) at time t51 when no TOC0 information command (TOC0info) has been supplied.

At time t52, the audio sending module 10 supplies the track mode and track size of the first content as the dubbed one or more pieces of content. Namely, the audio sending module 10 supplies the content number ("01" indicative of the first dubbing track) of the ATRAC data having title "Hello," the track mode "a6" of this content as shown in FIG. 14A, and the track size "0010.2f.0a" of this content, along with the TOC0 information command (TOC0info) "04".

When the track mode and track size of the first content (in this case, the ATRAC data having title "Hello" of the second content stored in the server 12) of the dubbed pieces of content have been supplied, the recording module 20 generates the information of U-TOC sector 0 based on the supplied information, performing the processing for recording onto the disc D. Therefore, at time t53, U-TOC sector 0 of the disc D records the track mode and start and end addresses of the first dubbed content. It should be noted that, because two tracks are already recorded on the disc D, the first of the dubbed content is controlled as the third track in U-TOC sector 0.

After performing the above-mentioned U-TOC processing, the recording module 20 outputs an acknowledge signal (ACK) at time t53 for example as shown in FIG. 16B. Receiving the acknowledge signal (ACK), the audio sending module 10 supplies a reset command (ACK-RESET) "08" to the recording module 20 to reset the acknowledge signal (ACK).

Subsequent to time t53, the audio sending module 10 supplies the track mode and track size of the second of the dubbed content as shown in FIG. 16A. Namely, the audio sending module 10 supplies the content number ("02" indicative of the second dubbed track) of the ATRAC data having title "Morning," the track mode "86" of this content, and the track size "0020.1e.00" of this content, along with the TOC0 information command (TOC0info) "08".

When the track mode and track size of the second dubbed content have been supplied, the recording module 20 generates the information of U-TOC sector 0 based on the. supplied information and performs the processing of recording onto the disc D. Therefore, at time t54, the track mode and start and end addresses for the second content are recorded in U-TOC sector 0 of the disc D. The second content thus dubbed is controlled as a fourth track on the disc D.

Then, the audio sending module 10 supplies a stop command (STOP) "03" at time t55 as shown in FIG. 16A. When the stop command (STOP) has been supplied, the recording module 20 determines that the processing corresponding to the TOC0 information command (TOC0info) "04" supplied before has ended, erasing the remaining data by regarding that there is no data subsequent to the end address corresponding to the second dubbed content.

Therefore, at time t56, the data of U-TOC0 of the already recorded first and second tracks and the tracks having titles "Hello" and "Morning" are controlled in U-TOC sector 0 of the disc D.

FIGS. 17A through 17D and 18A through 18D are timing charts indicative of the title information and so on to be supplied from the audio sending module 10 to the recording module 20 in the above-mentioned step F109. Specifically, FIGS. 17A through 17C and 18A through 18C show timing charts indicative of the data to be supplied from the audio sending module 10 to the recording module 20, while FIGS. 17D and 18D show recording states U-TOC sector 1 and U-TOC sector 4 of the disc D at each time.

As shown in FIG. 17D, only the titles of the already recorded first and second tracks are recorded in U-TOC sector 1 and U-TOC sector 4 of the disc D at time t61 when no title command (Title) is supplied.

The audio sending module 10 supplies the title of the first content as dubbed content at time t62. Namely, the audio sending module 10 supplies the content number of the ATRAC data, the number of characters to be supplied, and the character data of title "Hello" of this content, along with the title command (Title).

To be more specific, as shown in FIG. 17A, the audio sending module 10 sends track number "01" subsequent to a track number command (TNO) "05" to inform the recording module 20 of the information of the first content of the dubbed pieces of content. When the recording module 20 has performed the processing for the track number command (TNO) and supplied an acknowledge signal (ACK) as shown in FIG. 17B, the audio sending module 10 issues a reset command (ACK-RESET) "08" to reset the acknowledge signal (ACK) and then, at time t63, sends information including the number of characters and character string data along with a title command (Title) "83." When the title of the first content as the dubbed content has been supplied, the recording module 20 generates the information of U-TOC sector 1 and U-TOC sector 4 based on the supplied information to perform the processing of recording onto the disc D.

It should be noted that, if the number of title characters exceeds the specified value, the processing is performed several times. Namely, only four characters of data can be supplied once, four characters "Hell" are supplied as the number of characters being "4" at time t63 shown in FIG. 17A and then the remaining character "o" is supplied as the number of characters being "1" at time t64. Therefore, at time t65, the title corresponding to the first dubbed content (the third track on the disc D) is recorded in U-TOC sector 1 of the disc D. It should be noted that, if title information in kanji or European character is supplied in the above-mentioned sending method, the recording module 20 performs the recording of U-TOC sector 4 based on this information.

When the recording module 20 has completed the processing of the title information associated with the first content, the recording module 20 supplies an acknowledge signal (ACK) at time t65 for example as shown in FIG. 17B. The audio sending module 10 supplies a reset command (ACK-RESET) "08" to reset the acknowledge signal (ACK) and, at time t66 shown in FIG. 18A, supplies the title of the second content. Namely, the audio sending module 10 sends track number "02" as the content number of ATRAC data after a track number command (TNO) "05," informing the recording module 20 of the information of the second content of the dubbed pieces of content. When the recording module 20 has performed the processing for the track number command (TNO) and supplied an acknowledge signal (ACK) as shown in FIG. 18B, the audio sending module 10 issues a reset command (ACK-RESET) "08" to reset this acknowledge signal (ACK) and then sends the information including the number of characters and character string data along with a title command (Title) "83." It should be noted that, in this case, the character string is "Morning," which exceeds four characters, so that this character string is sent in two parts "Morn" and "ing."

When the title of the second dubbed content has been thus supplied, the recording module 20 generates information of U-TOC sector 1 (in some cases, sectors 1 and 4) based on the supplied information and performs the processing of recording onto the disc D. Therefore, the title corresponding to the second dubbed content (the fourth track on the disc D) is recorded in U-TOC sector 1 of the disc D at time t67. Then, when the recording module 20 has completed the title recording processing, the audio sending module 10 supplies a stop command (STOP) "03" to the recording module 20 at time t68, ending the processing as shown in FIG. 18A.

By performing the above-mentioned sequence of processing operations, the audio dubbing system 1 can record the U-TOC information associated with the audio data dubbed on the disc D. Namely, as shown in FIG. 19, the optical disc D can record the TOC information and ATRAC data of the third track having title "Hello" and the fourth track having title "Morning" dubbed from the server 12, along with the already recorded first track having title "Emotion" and second track having title "Dream."

As described, in the audio dubbing system 1, the audio data sending module 10 sends the track size of each track along with ATRAC data and, based on this track size, the recording module 20 separates a data stream recorded on the disc D to record the start and end addresses of each track into the U-TOC of the disc D. Consequently, the audio dubbing system 1 can correctly record the tracks selected by the user onto the disc D. In addition, the recording module 20 can record, onto the disc D, ATRAC data as one track according to a transmitted data stream and record the start and end addresses of each track by dividing the data stream of this one track, thereby enhancing the usage efficiency of the disc D.

7. Monitoring at Audio Dubbing

The following describes a method of transferring data between the audio sending module 10 and the reproducing module 41 of the audio dubbing system 1.

FIGS. 20A through 20E show states in which a track start portion of ATRAC data to be supplied from the audio sending module 10 to the recording module 20 is supplied to the reproducing module 41.

As described before, the audio sending module 10 supplies ATRAC data in units of predetermined size to the recording module 20 based on a request signal (Data Req) received from the recording module 20. Therefore, the audio sending module 10, if ATRAC data divided into blocks 1 through 16 for example is to be supplied to the recording module 20, supplies the ATRAC data on a block basis based on the request signal (Data Req) as shown in FIGS. 21A and 21B.

Figure 20:
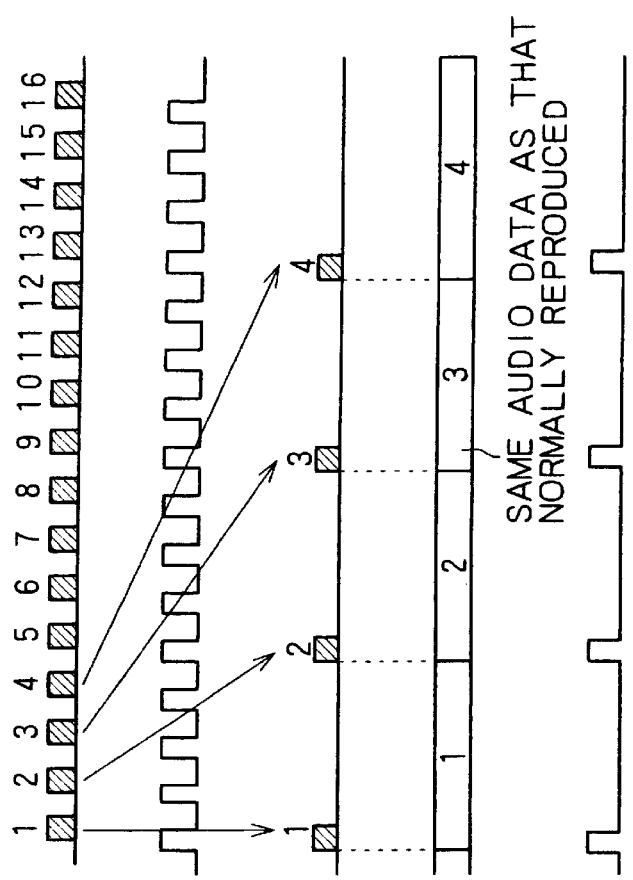
FIG. 20A is a timing chart indicative of ATRAC data to be supplied from the audio sending module 10 to the recording module 20.
FIG. 20B is a timing chart indicative of a request signal Data Req to be supplied from the recording module 20 to the audio sending module 10.
FIG. 20C is a timing chart indicative of ATRAC data to be supplied from the audio sending module 10 to the reproducing module 41.
FIG. 20D is a timing chart indicative of an audio signal to be reproduced by the reproducing module 41.
FIG. 20E is a timing chart indicative of a request signal Data Req supplied from the reproducing module 41.

The audio sending module 10 supplies ATRAC data in units of predetermined size to the reproducing module 41 based on a request signal (Data Req) received from the reproducing module 41 as shown in FIG. 20E. At this moment, the reproducing module 41 performs decoding and reproducing operations on the received ATRAC data to output an audio signal, supplying a next request signal (Data Req) to the audio sending module 10. Therefore, an interval at which the reproducing module 41 issues a request signal (Data Req) depends on the data compression ratio. For example, if the data compression ratio is about 4 to 1, then, as shown in FIGS. 20C through 20E, this interval is about four times as large as the interval (refer to FIG. 20B) at which the recording module 20 issues a request signal (Data Req).

Figure 21:
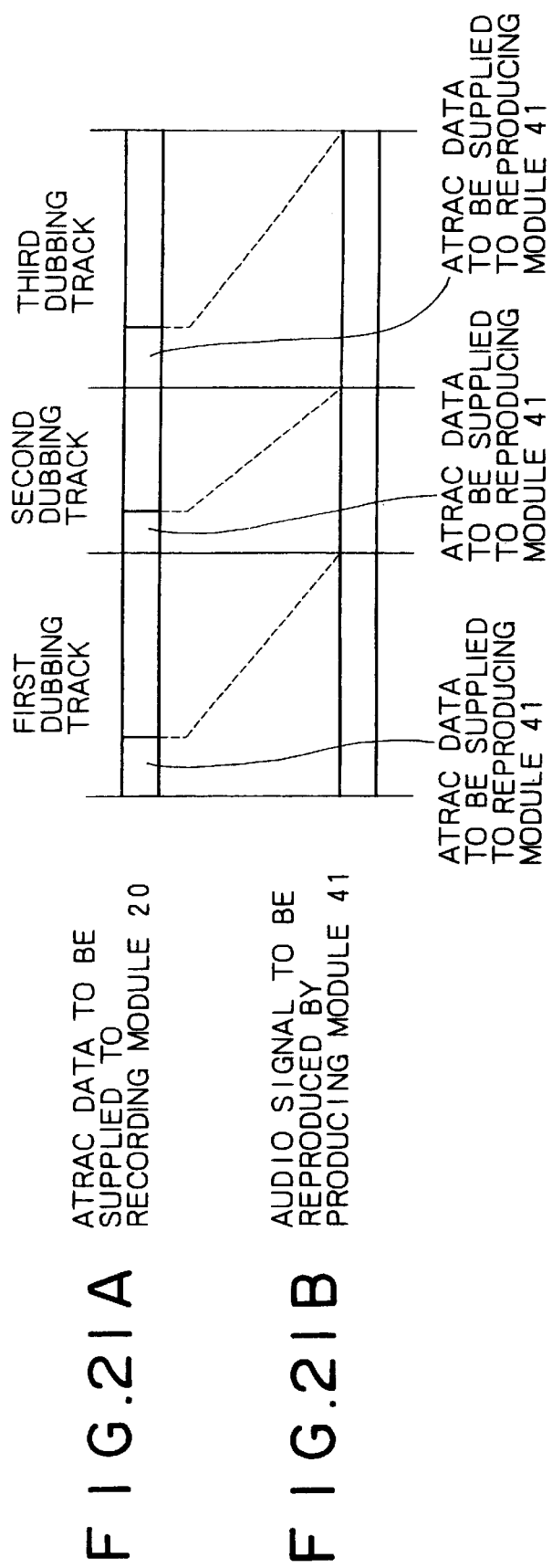
FIG. 21A is a diagram illustrating ATRAC data to be supplied to the recording module 20 when the recording module 20 records plural tracks of ATRAC data.
FIG. 21B is a diagram illustrating an audio signal to be reproduced by the reproducing module 41 when the recording module 20 records plural tracks of ATRAC data.

The audio sending module 10, based on the request signal (Data Req) supplied from the reproducing module 41, sequentially supplies the start portion, blocks 1 through 4, of the ATRAC data to be supplied to the recording module 20 as shown in FIG. 21C for example. It should be noted that, at this moment, the audio sending module 10 may store the ATRAC data to be sent to the reproducing module 41 into an external memory beforehand and supply the stored data to the reproducing module 41 as required by a request signal (Data Req) coming from the reproducing module 41.

FIGS. 21A and 21B show the ATRAC data to be supplied from the audio sending module 10 to the reproducing module 41 if the recording module 20 records plural pieces of ATRAC data onto the disc D. As far as one track is concerned, the ATRAC data to be supplied to the reproducing module 41 becomes as shown in FIG. 20D. In a data stream of plural tracks, the ATRAC data to be supplied to the reproducing module 41 becomes as shown in FIG. 21B.

As described above, the audio dubbing system 1 supplies the ATRAC data of plural tracks in one stream. For example, if three tracks are recorded on the disc D, the audio sending module 10 continuously supplies the first dubbing track through the third dubbing track (a dubbing track refers to content selected to be dubbed) to the recording module 20 as shown in FIG. 21A. Also, while sending the first dubbing track, the audio sending module 10 supplies the ATRAC data of the start portion of the first dubbing track to the reproducing module 41 as shown in FIG. 21B. Then, when the sending of the second dubbing track starts, the audio sending module 10 supplies the ATRAC data of the start portion of the second dubbing track to the reproducing module 41. When the sending of the third dubbing track starts, the audio sending module 10 supplies the ATRAC data of the start portion of the third dubbing track to the reproducing module 41 until the sending of the truck comes to an end.

For example, as shown in FIGS. 20D and 21B, to the reproducing module 41, about ¼ of the ATRAC data is supplied for each dubbing track, which is outputted as a monitor audio for the track (content) being dubbed in the recording module 20.

Figure 22:
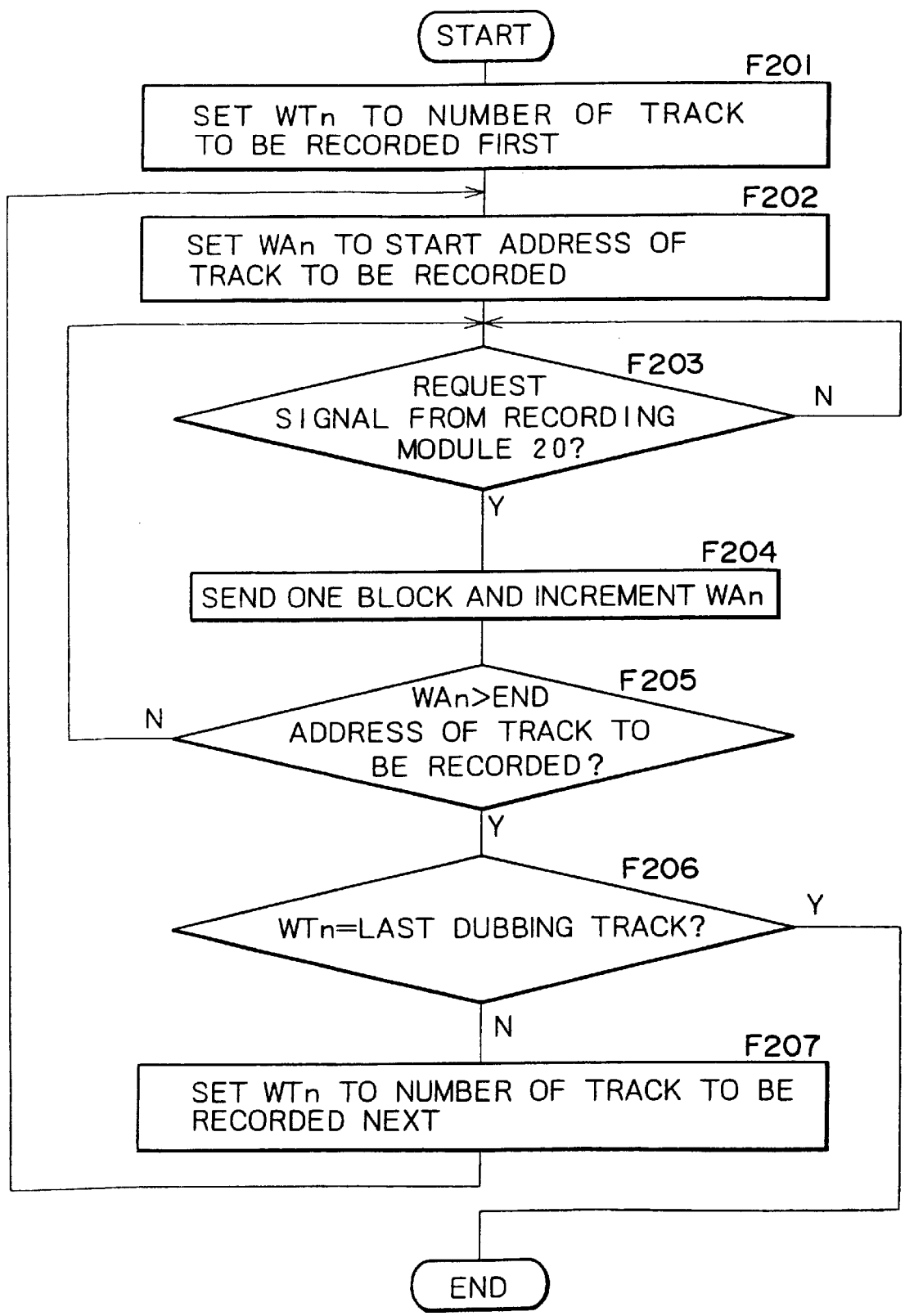
FIG. 22 is a flowchart indicative of a procedure of sending in the audio sending module 10.
Figure 23:
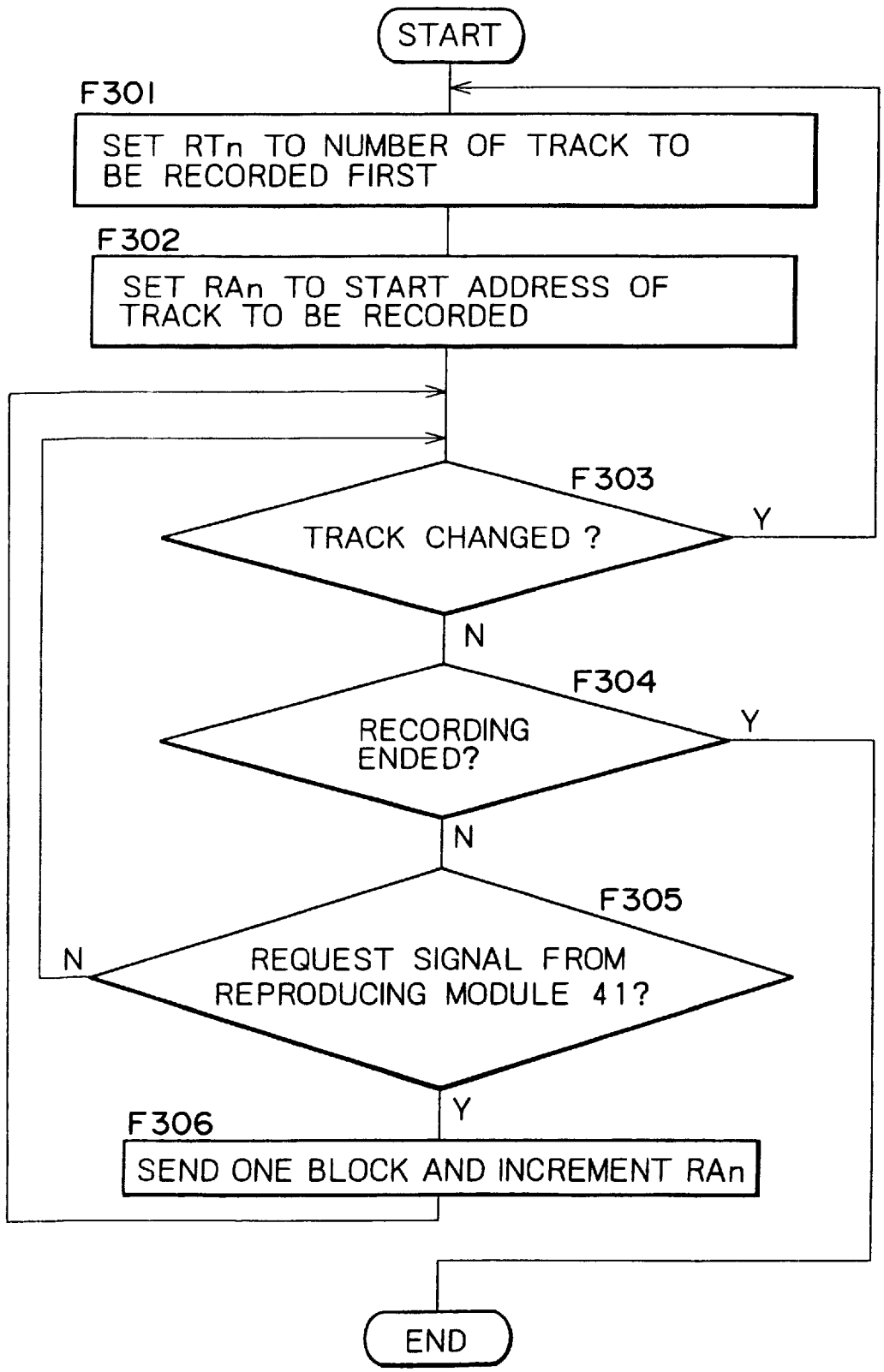
FIG. 23 is a flowchart indicative of monitor processing in a reproducing module 41.

FIGS. 22 and 23 are flowcharts indicative of the control operations to be performed by the audio sending module 10 when one or more tracks of ATRAC data are supplied from the audio sending module 10 to the recording module 20 for dubbing on the disc D. Specifically, FIG. 22 describes the transmission of ATRAC data to the recording module 20 and FIG. 23 describes the transmission of ATRAC data to the reproducing module 41. When a recording operation starts, the audio sending module 10 performs the processing of steps F201 through F207 shown in FIG. 22. In step F201, the audio sending module 10 sets the track number (hereafter referred to as a recording track number WTn) of a track (a dubbing track) to be supplied to the recording module 20 to the track first selected by the user. When the recording track number WTn has been set, the processing goes to step F202.

In step F202, the audio sending module 10 sets a compressed recording address WAn to the start address of the track to be recorded, or the track selected by the user. When the compressed recording address WAn as an address in the server 20 has been set, the processing goes to step F203.

In step F203, the audio sending module 10 checks for a request signal (Data Req) from the recording module 20 and waits in this step F203 until the request signal (Data Req) comes. When the request signal (Data Req) comes, the processing goes to step F204.

In step F204, the audio sending module 10 sends the ATRAC data of the block indicated by the compressed recording address WAn to the recording module 20. Then, the audio sending module 10 increments the compressed recording address WAn to the address of a next block, upon which the processing goes to step F205.

In step F205, the audio sending module 10 determines whether the compressed recording address WAn is greater than the end address of the dubbing track currently being transmitted. Namely, the audio sending module 10 determines whether all blocks of this dubbing track have been sent to the recording module 20 and the recording processing has ended. If the compressed recording address WAn is found not greater than the end address of the track to be recorded, the processing operations of step F203 and on are repeated. If the compressed recording address WAn is found greater than the end address of this dubbing track, the processing goes to step F206.

In step F206, the audio sending module 10 determines whether the current recording track number WTn is the track number of the last content of one or more pieces of contents (dubbing tracks) selected by the user. Namely, the audio sending module 10 determines whether all tracks to be dubbed have been recorded or not. If the recording track number WTn is found not the track number of the last content to be dubbed, then, in step F207, the recording track number WTn is updated. Namely, the track number of the dubbing track to be sent after the already transmitted dubbing track is substituted into the recording track number WTn. Then, the processing operations of step F202 and on are repeated. If, in step F206, the recording track number WTn is found the track number of the last track to be dubbed, it indicates that the ATRAC data has been transmitted for all dubbing tracks, upon which the processing comes to an end.

On the other hand, if ATRAC data is sent to the reproducing module 41 to perform reproduction processing while sending the ATRAC data to the recording module 20, the audio sending module 10 performs the processing operations of steps F301 through F306 concurrently with the processing shown in FIG. 22.

In step F301, when the recording processing starts, the audio sending module 10 sets a track number (hereafter referred to as a reproduction track number RTn) to be supplied to the reproducing module 41 to the track number of the track to be recorded in the recording module 20 as a dubbing track. When the reproduction track number RTn has been set, the processing goes to step F302.

In step F302, the audio sending module 10 sets a compressed reproduction address RAn to the start address of the track to be recorded, namely the track set in step F301. When the compressed reproduction address RAn has been set, the processing goes to step F303. Then, in step F303, the audio sending module 10 determines whether the track to be recorded has been changed. Namely, the audio sending module 10 determines whether the processing of step F207 has been updated and sending of the ATRAC data of the next dubbing track to the recording module 20 has started. If a track change as a recording operation is found, the processing operations of step F301 and on are repeated. If no track change is found, the processing goes to step F304.

In step F304, the audio sending module 10 determines whether the recording has ended. Namely, the audio sending module 10 determines whether the processing operations of steps F201 through F207 have ended. If the recording is found ended, the reproduction processing is ended. If the recording is found not ended, the processing goes to step F305.

In step F305, the audio sending module 10 determines whether there is a request signal (Data Req) from the reproducing module 41. If no request signal (Data Req) is found, the processing goes back to step F303, in which the audio sending module 10 determines whether a track change has occurred, the recording has ended, or the request signal (Data Req) has come. Namely, the audio sending module 10 waits in steps F303, F304, and F305. If the request signal (Data Req) from the reproducing module 41 is found, the processing goes to step F306.

In step F306, the audio sending module 10 sends the ATRAC data of the block of compressed reproduction address RAn to the reproducing module 41. Then, the audio sending module increments the compressed reproduction address RAn to the address of a next block. The processing goes back to step F303 to repeat the processing operations of steps F303 and on are repeated.

As described above, in the audio dubbing system 1, while the recording module 20 is recording the ATRAC data, the reproducing module 41 decompresses for reproduction the compressed ATRAC data to be recorded by the recording module 20. Hence, when recording one or more tracks onto the disc D, the user can confirm the audio data of the corresponding track being recorded.

In the audio dubbing system 1, the sending of ATRAC data to the recording module 20 and the sending of ATRAC data to the reproducing module 41 are separately performed by the audio sending module 10. Therefore, if the user desires to reproduce a next dubbing track while the first dubbing track is being recorded for example, the user can skip the reproduction of the first dubbing track by operating the operator panel 13. To be more specific, based on the input made by the user, the audio dubbing system 1 updates the processing of step F303 to skip monitor reproduction of a specified track. By changing the setting of the reproduction track number RTn in step F301, the monitor signal for the already recorded track can be reproduced for example. Thus, in the audio dubbing system 1, when recording the ATRAC data of plural tracks onto the disc D, any of the tracks to be recorded that is desired by the user can be reproduced.

Figure 24:
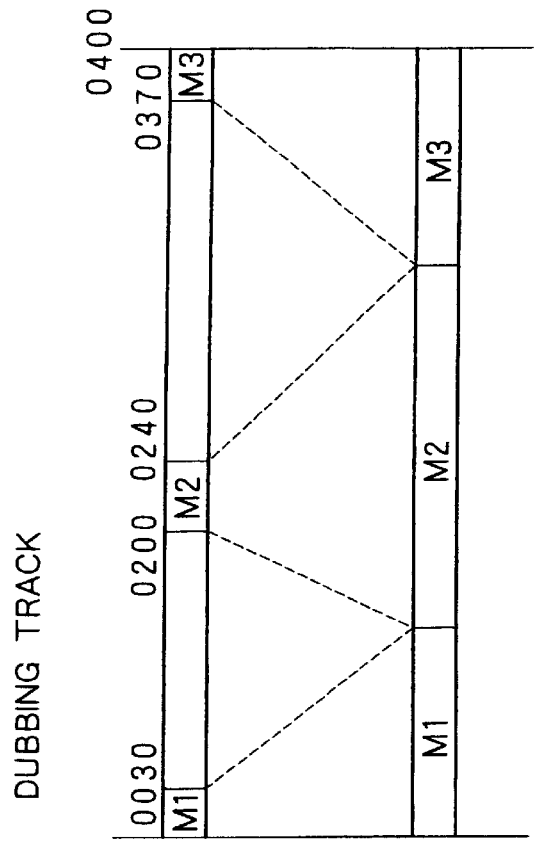
FIG. 24A is a timing chart indicative of an ATRAC signal, which is a compressed audio signal to be supplied to the recording module 20.
FIG. 24B is a timing chart indicative of output of monitor audio reproduced by the reproducing module 41.

With reference to FIGS. 20A through 20E and FIGS. 21A and 21B, an example was described in which the start portion of each track is supplied to the reproducing module 41 for monitor output. The portion for monitor output is not necessarily the start portion; other portions may also be outputted for monitoring. FIGS. 24A and 24B show an example in which, of the ATRAC data to be supplied from the audio sending module 10 to the recording module 20, an arbitrary portion of a track is supplied to the reproducing module 41.

Some content providers (namely music providers) who use the audio dubbing system 1 for providing content may preset a portion to be reproduced while the user is recording content onto the disc D. For example, a content provider may want to reproduce the prelude, climax, and postlude of a piece of music. In such a case, of the ATRAC data to be supplied to the recording module 20, the addresses of specified portions are set as shown in FIG. 24A. Then, the audio sending module 10 supplies the ATRAC data with the addresses set to the reproducing module 41. The reproducing module 41 reproduces the supplied ATRAC data as shown in FIG. 24B.

As shown in FIG. 25, the server 12 stores, in a track data table, the number of units (M1, M2, and so on) to be reproduced in each track and the addresses of these units for each stored track (content). The main controller 11 of the audio sending module 10 references this track data table to supply the ATRAC data to the reproducing module 41.

To record track 1 onto the disc D, the audio sending module 10 references the track data table shown in FIG. 25 to first supply addresses "0000" through "0030" to the reproducing module 41, then addresses "0200" through "0240" to the reproducing module 41, and lastly addresses "0370" through "0400" to the reproducing module 41. Therefore, the reproducing module 41 can output a corresponding audio signal as shown in FIG. 24B.

Thus, if the units are set as portions to be reproduced for monitoring, the updating of reproduction address RAn in step F306 of FIG. 23 may be executed such that portions of the units are sequentially transmitted continuously. Namely, the audio sending module 10 references the track data table shown in FIG. 25 to obtain the address set to the corresponding track. Based on the obtained address, the audio sending module 10 updates reproduction address RAn in step F306, while sending the ATRAC data on a block basis.

It should be noted that, in the audio dubbing system 1, the addresses of other tracks may be entered in the track data table to reproduce these tracks. For example, other pieces of music created by the same creator of the piece to be recorded may be reproduced. The track data table may also be displayed on the indicator 14 for the user to select portions to be reproduced, thereby reproducing the ATRAC data desired by the user.

8. Printing Associated Information

In the audio dubbing system 1, ATRAC data to be recorded onto the disc D may be reproduced by the reproducing module 41 for monitoring as described above. Alternatively, instead of reproducing by the reproducing module 41, a still image, a moving picture, or text data for example may be reproduced by the associated information reproducing module 46 as the associated information of ATRAC data to be recorded on the disc D.

To be specific, the server 12 stores a photograph of the creator (performer, song writer, composer, or the like) and an image picture for example corresponding to each track listed in the track data table as compressed data as shown in FIG. 25.

The server 12 also stores the lyrics and text data indicative of creator history of each track.

If the above-mentioned creator photograph and moving picture for example are stored in a video CD or an Internet home page, the server 12 stores chapter numbers of the video CD and URL addresses.

To record tracks selected by the user onto the disc D, the main controller 11 of the audio sending module 10 references the associated information table shown in FIG. 25 when ATRAC data is read from the server 12 and supplied to the recording module 20, supplying the contents of the information listed in the table of the corresponding track to the associated information reproducing module 46.

If there is image data as bitmap data and compressed data, the main controller 11 of the audio sending module 10 obtains a file of the image data from the server 12 and supplies the file to the printer 47 or the display monitor 48 of the associated information reproducing module 46. When the image data is supplied, the printer 47 of the associated information reproducing module 46 prints the image data onto paper according to the operation performed by the user for example. A specific example of a printing operation to be performed by the printer 47 will be described later. On the other hand, when the image data is supplied, the display monitor 48 of the associated information reproducing module 46 displays the image data according to the operation performed by the user for example.

If there is text data, the main controller 11 of the audio sending module 10 obtains a file of the text data from the server 12 and supplies the file to the printer 47 or the display monitor 48 of the associated information reproducing module 46. When the text data is supplied, the printer 47 of the associated information reproducing module 46 prints the text data on paper according to the operation performed by the user for example. On the other hand, when the text data is supplied, the display monitor 48 of the associated information reproducing module 46 displays the text data according to the operation performed by the user for example.

If there is a chapter number indicative of the reproducing position of a video CD or a DVD, the main controller 11 of the audio sending module 10 obtains the video data for example having that chapter number from the optical disc drive 45 and supplies the video data to the printer 47, the display monitor 48, and the speaker 49 of the associated information reproducing module 46. When the video data is supplied, the display monitor 48 for example of the associated information reproducing module 46 outputs a moving picture or a still image according to the operation performed by the user for example.

If there is a URL, which is a WWW server address, the main controller 11 of the audio sending module 10 obtains the associated information from a corresponding Internet home page for example through the communication interface 44 and supplies the obtained associated information to the printer 47, the display monitor 48, and the speaker 49 of the associated information reproducing module 46. When the www server information is supplied, the printer 47 and the display monitor 48 for example of the associated information reproducing module 46 outputs a moving picture, a still image, audio, and character information for example.

As described, the audio dubbing system 1 can obtain associated information such as image, audio, and text data stored in the server 12, other recording media such as CD-ROM and video CD, or transmission media such as networks including the Internet, while ATRAC data is being recorded onto the disc D. Therefore, while recording ATRAC data onto the disc D, the audio dubbing system 1 can display an image of or a message by the creator singing a selected song onto the display monitor 48 or print the lyrics of the song or a profile of the creator through the printer 47. In addition, because the optical disc drive 45 for video CD or DVD is provided, the audio dubbing system 1 can display creator promotion video for example and supply creator information over a transmission medium through the communication interface 44.

The output of the reproducing module 41, the display monitor 48, or the speaker 49 is provided to the user only while the user is dubbing content onto the disc D. On the other hand, the print output from the printer 47 is taken out by the user along with the dubbed disc D, so that value can be added to the print as an additional article to the content dubbed on the disc D. In the present embodiment, value is added by this print output to the form in which content such as music is provided.

Figure 26:
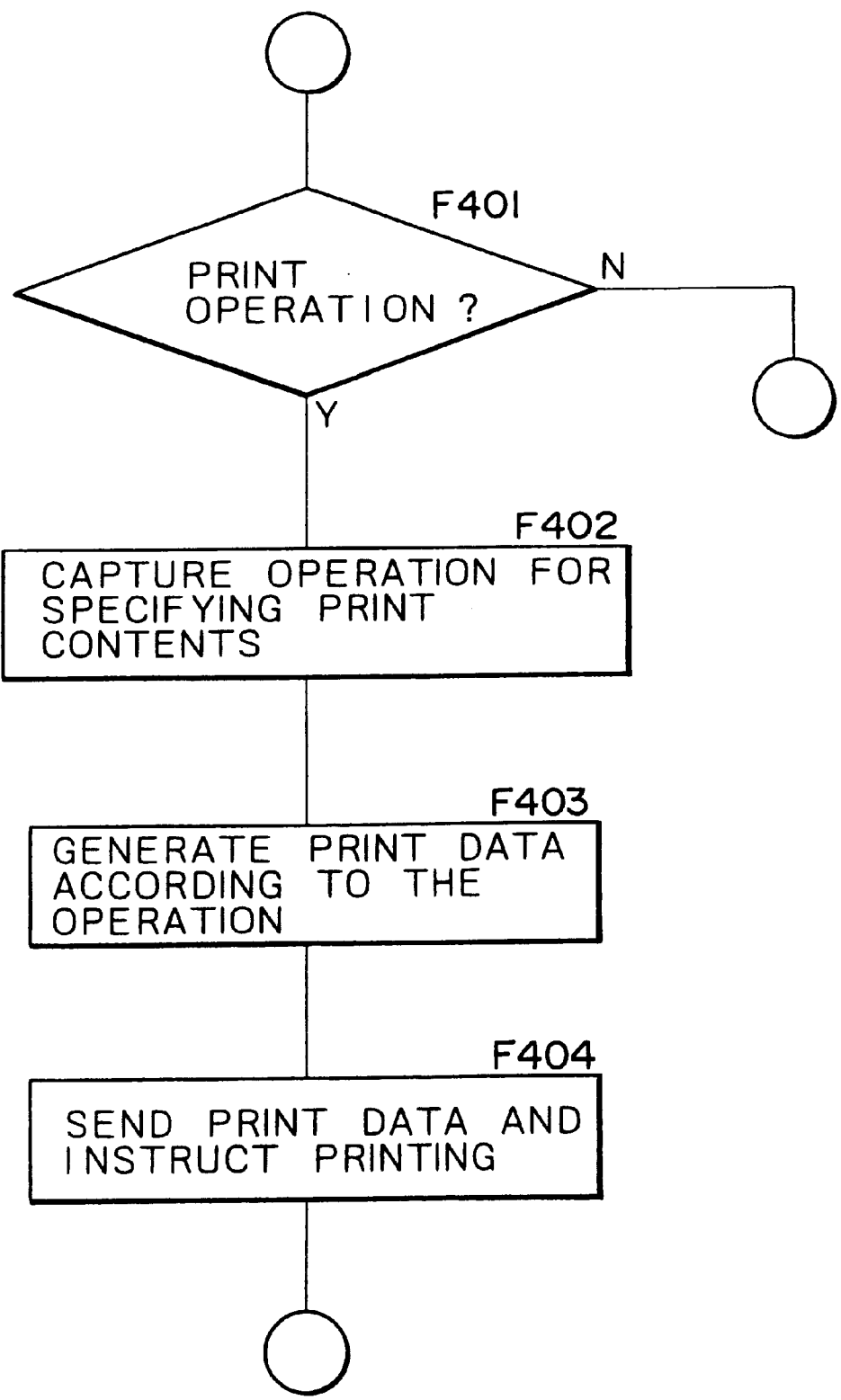
FIG. 26 is a flowchart indicative of a control procedure according to a printing operation associated with the invention.

FIG. 26 shows processing by the main controller 11 for printing associated information. For example, while dubbing content onto the disc D, the user can operate the operator panel 13 according to the indication displayed on the indicator 14 to print desired associated information and take out the print.

If the user instructs printing by specifying one or more pieces of associated information, the processing goes from step F401 to step F402, in which the main controller 11 captures the operation performed by the user. Then, in step F403, the main controller 11 generates print data to be sent to the printer 47 so that the associated information requested by the user is printed. In step F404, the main controller 11 sends a print command to the printer 47 along with the generated print data. Based on this command, the printer 47 prints the print data, providing the associated information requested by the user in the form of a paper card or a label. For example, the print may also be predetermined for each content, disabling print selection by the user.

The above-mentioned print may attain varieties in the types of print contents and print paper for example. The source of the associated information may be the above-mentioned table stored in the server 12, an optical disc to be reproduced by the optical disc drive 45, or the Internet to be accessed through the communication interface 44. In addition, data inputted by the user through the operator panel 13 may also be used as the associated information.

Main types of the form in which associated information is provided include image data such as bitmap data and character data such as text data. The contents of these data are as various as title and lyrics of music as content, album title, creator name, names of song writer, composer, editor, and producer (production credit), history and message of creator, description of music and album, photographs of creator and others, image picture of music, and cover picture of album for example.

The following describes the print output of the above-mentioned associated information in the forms shown below:

(a) printing a label for Mini Disc;
(b) printing a lyrics card or a cover card;
(c) printing an image reproduced by video CD; and
(d) printing Internet information.

(a) Printing a Label for Mini Disc

Figure 27:
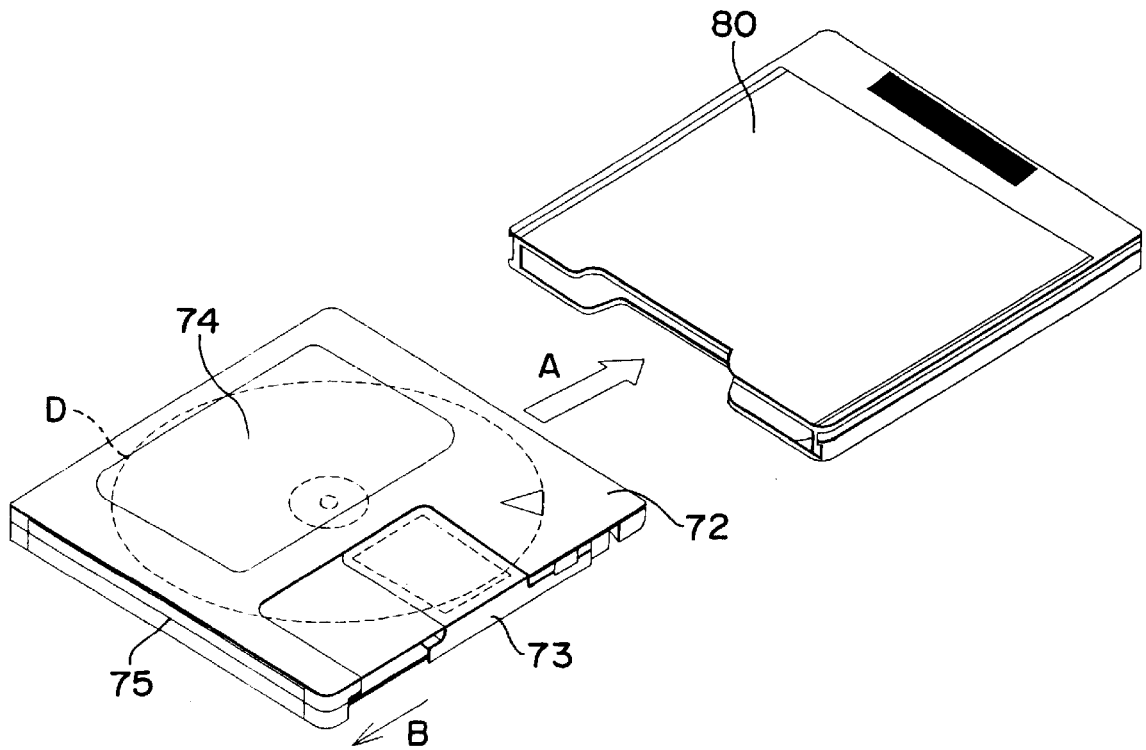
FIG. 27 is a schematic diagram illustrating a disc cartridge and an accommodating case associated with the invention.

The external view of a Mini Disc to be used as the disc D in the present embodiment is as shown in FIG. 27. The magneto-optical disc D on which recording and reproducing are performed is loaded in a cartridge 72 and cannot be taken out by the user. In recording or reproduction, a shutter 73 is slid by a recording/reproducing apparatus to expose the disc D, on which an optical head or a magnetic head records or reproduces information. The cartridge 72 can be accommodated in a case 80. It is recommended that the cartridge 72 be accommodated in the case 80 for storage or transportation.

Figure 28A:
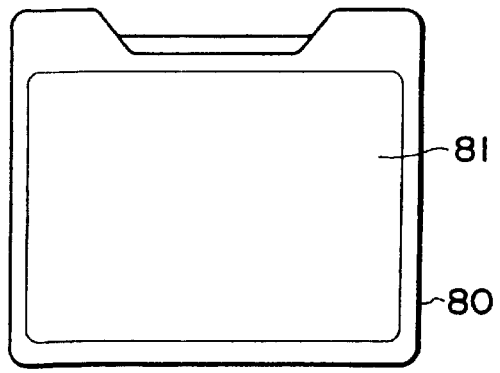
FIG. 28A is a rear view illustrating the accommodating case on which a label printed in the audio dubbing system practiced as the first preferred embodiment is attached.
Figure 28B:
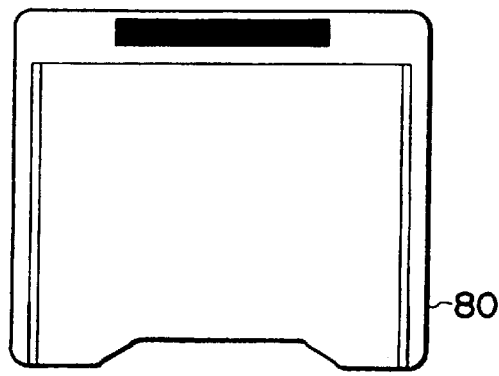
FIG. 28B is a front view illustrating the accommodating case on which the label printed in the audio dubbing system practiced as the first preferred embodiment is attached.

Preferably, the contents such as music recorded on the disc D can be viewed by the user at a glance. For this purpose, the cartridge 72 and the case 80 have a an external area on which the user can attach a label written by the user with information such as a music title. Namely, the cartridge 72 has a long label attaching area 75 along its side and another label attaching area 74 in a range on its upper side not obstructing the shutter 73. FIGS. 28A and 28B show the bottom and top of the case 80. The top of the case 80 shown in FIG. 28B is formed by a transparent resin for example, while the bottom shown in FIG. 28A is made of a opaque resin. The major portion of the bottom provides a label attaching area 81.

For example, these label attaching areas 74, 75, and 81 allow the user to attach a label written with a title onto the label attaching area 74 and labels written with titles of recorded pieces of music and other information onto the label attaching areas 75 and 81 for convenience. In the present embodiment, the audio dubbing system 1 generates, by use of associated information, labels by printing that are attachable on the label attaching areas 74, 75, and 81 and provides the generated labels for the user when dubbing is performed on the disc D.

For example, a label mount 90 as shown in FIG. 29 is prepared on the printer 47 as print paper. The label mount 90 has labels 92, 93, and 91 having sizes suitable for the label attaching areas 74, 75, and 81 respectively on a label mount portion 94.

According to the operation performed by the user captured in step F402 of FIG. 26, the main controller 11 generates print data. It is assumed here that the user has specified label printing and selected a particular image and text data for a label to be printed. Then, the main controller 11 generates print data for printing a label as shown in FIG. 29 for example. To be more specific, in the case of FIG. 29, the main controller 11 generates text data for title and creator name as the label 92, image data such as creator photograph and text data for dubbed music title as the label 93, and image data for creator photograph as the label 91. The generated data are sent to the printer 47 to generate the label mount 90 on which the label printed with characters and an image shown is attached.

Thus, according to user selection or preset information, the Mini Disc label as shown in FIG. 29 is provided for the user. The user can use this label for the disc D dubbed by the recording module 20 for convenience. Especially, on a small-size disc such as a Mini Disc, the label attaching areas 74, 75, and 81 are small proportionately and therefore it is not easy for users to write characters on these labels by themselves. Consequently, the capability of generating the labels written with user-specified image and text by the above-mentioned embodied system provides a significantly high added value.

(b) Printing Lyrics Card and Cover Card

Figure 30A:
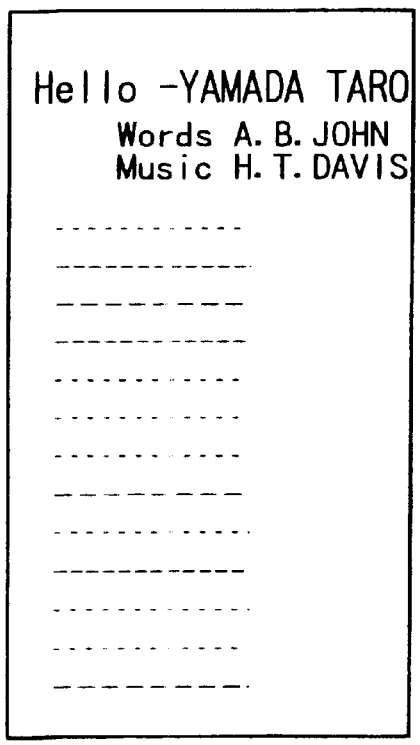
FIG. 30A is a schematic diagram illustrating a lyrics card to be printed in the audio dubbing system practiced as the first preferred embodiment.
Figure 30B:
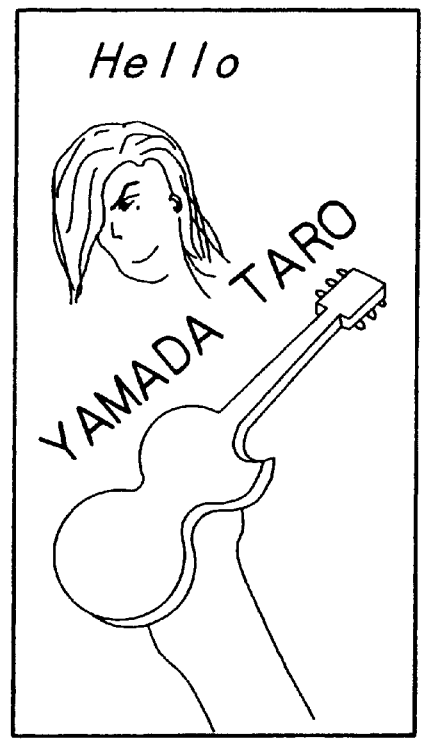
FIG. 30B is a schematic diagram illustrating a cover card to be printed in the audio dubbing system practiced as the first preferred embodiment.

Print output by the printer 47 may also be made on plain paper rather than sticking labels. For example, print paper of a predetermined size is prepared, on which characters or images as associated information are printed as specified by the user or by the system automatically. FIG. 30A illustrates an example of a printed lyrics card corresponding to the dubbed track. FIG. 30B illustrates an example of a cover card printed with a creator photograph and an image picture corresponding to the dubbed track.

In printing associated information on plain paper, the size thereof is not limited as it is with the label shown in FIG. 29. Therefore, information represented by many characters such as lyrics, message, or description can be printed. Obviously, other various information may also be printed on print paper. Print paper is of various sizes, so that many various pieces of information can be provided at a time. For user convenience, the print paper may be folded into a size that fits in the case 80 along with the cartridge 72 of Mini Disc.

(c) Printing an Image Reproduced by Video CD

As described, the main controller 11 references the track data table stored in the server 12 to make the optical disk drive 45 reproduce associated information during dubbing, thereby outputting video/audio information associated with the track being dubbed by means of the display monitor 48 and the speaker 49. At this moment, the user may make the optical disc drive 45 perform search, slow playback, and pause operations through the operator panel 13 to select a desired image for example. Then, the main controller 11 supplies the selected image data to the printer 47 as the print data to be printed. For example, this constitution allows the user, when a promotion video of the music being dubbed is reproduced by the optical disc drive 45, to obtain the image of a desired scene along with the dubbed music.

(d) Printing Internet Information

Further, the main controller 11 references the track data table stored in the server 12 to access an Internet home page associated with the music being dubbed, providing the user with information about the music and its creator for example. The information thus obtained may be displayed on the display monitor 48 for example according to the operation performed by the user. Also, the main controller 11 may supply the image data and character data specified by the user for printing to the printer 47 as print data. This constitution allows the user to obtain wider and up-to-date information associated with the music being dubbed and its creator for example along with the dubbed music.

As described, various forms of print output are practical. Obviously, other forms of print output are possible. The audio dubbing system 1 according to the invention can perform dubbing on a content basis (namely, in units of pieces of music), so that, if pieces of music by plural creators are to be dubbed, album titles to be printed may be hardly set automatically. To circumvent such a problem, the title of the first piece of music selected by the user may be used as an album title or a character string for an album title may be entered by the user from the operator panel 13.

In printing titles of recorded music in a list, the titles of dubbed tracks may simply be arranged sequentially. If one or more pieces of music were recorded on the disc D before new tracks are dubbed, the titles of the already recorded tracks may be included in the printed list after dubbing of the new tracks. The titles of the tracks already recorded before dubbing of the new tracks may be captured by the main controller 11 that requests the recording module 20 for the TOC information of the disc D for example.

9. Print Output Including Camera Images

The following describes another preferred embodiment of the invention obtained by adding capabilities to the above-mentioned audio dubbing system 1. A constitution illustrated in FIG. 31 has an image taking module 50, an image editing module 51, and an uploading system 52 in addition to the constitution shown in FIG. 1.

The uploading system 52 allows a provider of music for example to record ATRAC data and address tables as content stored in a server 12. The music provider uploads new pieces of music and associated information thereof into the server 12, thereby allowing the user thereafter to dub the uploaded music and print associated information.

The uploading system 52 may be made available to general users, thereby forming a free information system not limited to particular music providers. For example, amateur musicians bring music composed by themselves in a Mini Disc and load their music into the server 12 by using the uploading system 25 to release their music through the audio dubbing system 1. It should be noted that adding the capability of transmitting the ATRAC data and TOC information recorded on the disc D loaded in the recording module 20 allows the same to server also as the uploading system.

The image taking module 50 especially gives a variety to the contents of printing by a printer 47. The image taking module 50 has a CCD camera for example and is adapted to take a picture of the user who is using the audio dubbing system 1 for example. The image data generated by the image taking module 50 is edited by the image editing module 51. Image data supplied from a main controller 11 is also inputted in the image editing module 51 to be synthesized with a camera image for example. The image data edited by the image editing module 51 is supplied to the printer 47 as print data to be printed.

In such a system, the user selects a background image through an operator panel 13 while looking at guide display on an indicator 14 for example and make the image taking module 50 take a picture of the user on the selected background image.

For example, the main controller 11 displays on the indicator 14 several pieces of images, which are associated information of the music being dubbed, as background images and lets the user select a desired one. When the selection has been made, the main controller 11 informs the user of taking a picture and takes a picture of the user. The resultant image data is sent to the image editing module 51. The main controller 11 sends the image data as the selected background image to the image editing module 51. The image editing module 51 synthesizes the camera image data of the user and the background image data to send the resultant synthesized image data to the printer 47.

Figure 32:
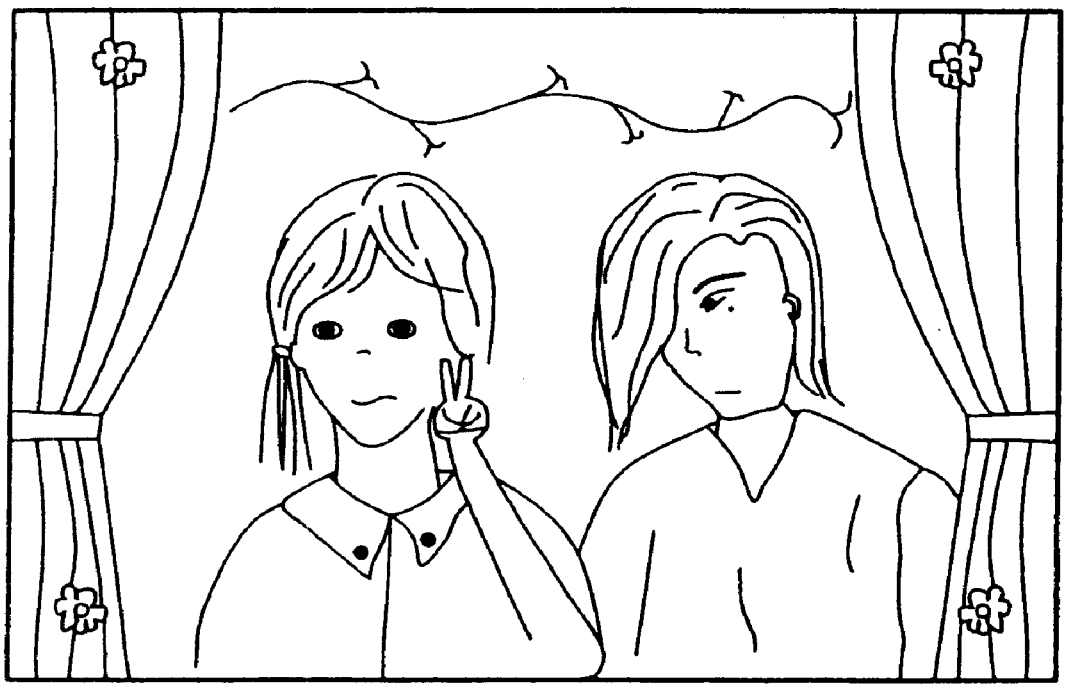
FIG. 32 is a diagram illustrating an example of printing an image taken by the audio dubbing system shown in FIG. 31.

The printer 47 prints the synthesized image data. If the user has selected as the background image a photograph of the creator of the music being dubbed, an image carrying the user and the creator together is printed as shown in FIG. 32. This image data may also be printed on labels arranged on a mount for more user enjoyment.

Thus, some examples of print output according to the above-mentioned preferred embodiments of the invention have been described. Other forms than print output in which the user can take out the associated information about dubbed music include the use of the disc D itself. For example, the image data or character data described as objects to be printed may be recorded in a predetermined sector of the U-TOC of the disc D. For example, an unused sector as a U-TOC sector is assigned as an area for recording the character data or the image data. The user reads the recorded character data or image data by means of a Mini Disc reproducing apparatus of the user for example to display the character data or the image data onto the display monitor or print the same through the printer of a personal computer system of the user for example.

The above-mentioned preferred embodiments have been described by use of examples in which audio data is recorded on a magneto-optical disc. It will be apparent that the present invention is also applicable to the recording of video data. It will be also apparent that any other random access recording media other than magneto-optical discs such as Mini Disc may be used in the above-mentioned preferred embodiments.

As mentioned above and according to the invention, when information is provided as audio data by means of a dubbing operation, associated information about content being dubbed can also be printed for the user to take it out. This novel constitution realizes an audio data providing form of higher added value.

The above-mentioned associated information may be stored in a storage means in correspondence to each piece of audio data, may be stored in another storage medium, or may be obtained from a communication network. This novel constitution provides a variety of information. For example, a variety of associated information such as lyrics card, image picture, photograph, creator profile, creator message, and credit of composer/song writer and producer can be effectively used as information to be printed, thereby realizing a significantly useful information providing form for both information provider and user.

Further, use of information taken by camera as information to be printed allows provision of a user-friendly image such as one in which both the user and the creator of dubbed music are printed.

Still further, labels may be used as print paper. A title label, an creator name label, and so on may be attached to appropriate label attaching areas on a recording medium such as a Mini Disc on which audio data is recorded, thereby enhancing user convenience.

While the preferred embodiments of the present invention have been described using specific terms, such description is for illustrative purposes only, and it is to be understood that changes and variations may be made without departing from the spirit or scope of the appended claims.

What is claimed is:

1. An audio dubbing system for dubbing on a recording medium an audio program selected from a memory storing a plurality of compressed audio programs, comprising:

recording means for recording said audio program selected from said memory on said recording medium;

receiving means for receiving associated information about said audio program selected from said memory; and printing means for automatically printing, without input from a user of the audio dubbing system at a time following said recording, said associated information received by said receiving means onto a sticker adapted to be attached to said recording medium.

2. The audio dubbing system according to claim 1, wherein the associated information is at least one of a jacket image, a lyric, a title, and a track name.

3. An audio dubbing system for dubbing on a recording medium an audio program selected from a memory storing a plurality of compressed audio programs, comprising:

recording means for recording said audio program selected from said memory on said recording medium;

receiving means for receiving associated information about said audio program selected from said memory; and printing means for automatically printing, without input from a user of the audio dubbing system at a time following said recording, said associated information received by said receiving means onto a plurality of stickers that are adapted to be attached to the recording medium and to a case for enclosing the recording medium.

4. The audio dubbing system according to claim 3, wherein the associated information is at least one of a jacket image, a lyric, a title, and a track name.

5. An audio dubbing system for dubbing on a recording medium an audio program selected from a memory storing a plurality of compressed audio programs, comprising:

recording means for recording said audio program selected from said memory on said recording medium;

receiving means for receiving via a communication line associated information about said selected audio program selected from said memory; and printing means for automatically printing, without input from a user of the audio dubbing system at a time following said recording, said associated information received by said receiving means onto a sticker adapted to be attached to one of the recording medium and a case for enclosing the recording medium.

6. The audio dubbing system according to claim 5, wherein the communication line is an ISDN line.

7. The audio dubbing system according to claim 5, wherein the communication line is a telephone line.

8. The audio dubbing system according to claim 5, wherein the associated information is at least one of a jacket image, a lyric, a title, and a track name.

* * * * *